(12) United States Patent
Park et al.

(10) Patent No.: US 11,424,845 B2
(45) Date of Patent: Aug. 23, 2022

(54) ELECTRONIC APPARATUS AND CONTROL METHOD THEREOF

(71) Applicant: SAMSUNG ELECTRONICS CO., LTD., Suwon-si (KR)

(72) Inventors: Byeol Park, Suwon-si (KR); Daewon Yoon, Suwon-si (KR); Gohwoon Jeong, Suwon-si (KR); Sangshin Park, Suwon-si (KR); Changkun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/184,191

(22) Filed: Feb. 24, 2021

(65) Prior Publication Data
US 2021/0266083 A1   Aug. 26, 2021

(30) Foreign Application Priority Data
Feb. 24, 2020   (KR) .................. 10-2020-0022554

(51) Int. Cl.
*H04H 60/37* (2008.01)
*H04H 60/33* (2008.01)
(Continued)

(52) U.S. Cl.
CPC ......... *H04H 60/37* (2013.01); *G06Q 30/0272* (2013.01); *H04H 60/33* (2013.01);
(Continued)

(58) Field of Classification Search
None
See application file for complete search history.

(56) References Cited

U.S. PATENT DOCUMENTS

| 7,356,477 B1 * | 4/2008 | Allan ................ G07G 1/01 705/14.4 |
| 9,066,115 B1 * | 6/2015 | Cherry .............. H04N 21/8586 |

(Continued)

FOREIGN PATENT DOCUMENTS

| KR | 1020060027826 A | 3/2006 |
| KR | 100653096 B1 | 12/2006 |

(Continued)

OTHER PUBLICATIONS

International Search Report (PCT/ISA/210) and Written Opinion (PCT/ISA/237) dated Apr. 7, 2021 issued by the International Searching Authority in International Application No. PCT/KR2020/017878.

*Primary Examiner* — Ricky Chin
(74) *Attorney, Agent, or Firm* — Sughrue Mion, PLLC

(57) ABSTRACT

An electronic apparatus includes an interface circuitry; a display; a memory storing one or more instructions; and a processor configured to execute the one or more instructions to: receive a broadcast signal of any one of a plurality of channels through the interface circuitry, control the display to display an image of a content based on the received broadcast signal, identify timing when the content switches from a first content to a second content having a different type than the first content based on a change in a video characteristic defined corresponding to the type of the content, and perform a first operation related to the second content based on the identified timing.

15 Claims, 14 Drawing Sheets

(51) Int. Cl.
    *G06Q 30/02*      (2012.01)
    *H04H 60/59*      (2008.01)
    *H04H 60/58*      (2008.01)
    *H04N 5/14*      (2006.01)
    *H04N 21/458*      (2011.01)
    *H04N 21/44*      (2011.01)
    *H04N 21/81*      (2011.01)
    *H04N 21/45*      (2011.01)

(52) U.S. Cl.
    CPC ......... *H04H 60/375* (2013.01); *H04H 60/58* (2013.01); *H04H 60/59* (2013.01); *H04N 5/147* (2013.01); *H04N 21/44008* (2013.01); *H04N 21/44016* (2013.01); *H04N 21/458* (2013.01); *H04N 21/4532* (2013.01); *H04N 21/812* (2013.01)

(56) References Cited

U.S. PATENT DOCUMENTS

| | | | |
|---|---|---|---|
| 9,510,044 B1* | 11/2016 | Pereira | H04N 21/44204 |
| 9,628,836 B1* | 4/2017 | Kalampoukas | H04N 21/23424 |
| 10,231,033 B1* | 3/2019 | Bumgarner | H04N 21/4825 |
| 10,313,710 B1* | 6/2019 | Karlsson | H04N 21/8456 |
| 10,841,667 B2* | 11/2020 | Srinivasan | H04N 21/812 |
| 10,848,791 B1* | 11/2020 | Germano | G06K 9/6262 |
| 10,856,053 B1* | 12/2020 | Shi | H04N 21/6582 |
| 10,860,860 B1* | 12/2020 | Huynh | H04N 21/84 |
| 10,873,697 B1* | 12/2020 | Jain | H04N 21/234318 |
| 2005/0146605 A1* | 7/2005 | Lipton | H04N 7/18 375/E7.006 |
| 2006/0143650 A1 | 6/2006 | Tanikawa et al. | |
| 2007/0008909 A1* | 1/2007 | Tsusaka | H04N 7/16 348/E7.054 |
| 2009/0288131 A1* | 11/2009 | Kandekar | G06F 16/48 455/414.1 |
| 2010/0053452 A1* | 3/2010 | Abe | H04N 7/163 348/700 |
| 2010/0166394 A1* | 7/2010 | Ariyoshi | H04N 21/6175 705/26.1 |
| 2012/0042091 A1* | 2/2012 | McCarthy | H04N 21/812 709/231 |
| 2012/0137015 A1* | 5/2012 | Sun | H04N 21/23109 709/231 |
| 2013/0036438 A1 | 2/2013 | Kutaragi et al. | |
| 2013/0091521 A1* | 4/2013 | Phillips | H04N 21/23424 725/35 |
| 2013/0237317 A1 | 9/2013 | Rychagov et al. | |
| 2014/0068664 A1* | 3/2014 | Bourne | H04N 21/23412 725/35 |
| 2014/0086556 A1* | 3/2014 | Yoshida | G06V 20/46 386/241 |
| 2014/0193133 A1* | 7/2014 | Parambil | H04N 21/4333 386/230 |
| 2015/0106841 A1* | 4/2015 | Wolf | H04N 21/812 725/32 |
| 2015/0120768 A1* | 4/2015 | Wellen | H04N 21/858 707/755 |
| 2015/0189401 A1* | 7/2015 | Yi | H04N 21/812 725/32 |
| 2015/0304591 A1* | 10/2015 | Hirabayashi | G06Q 30/0267 348/731 |
| 2015/0365725 A1* | 12/2015 | Belyaev | H04N 21/6175 725/46 |
| 2016/0066032 A1* | 3/2016 | Grant | H04N 21/4394 725/19 |
| 2016/0105708 A1* | 4/2016 | Packard | H04N 21/23439 725/10 |
| 2016/0337691 A1* | 11/2016 | Prasad | H04N 21/812 |
| 2016/0378276 A1* | 12/2016 | Shah | H04N 21/458 715/720 |
| 2018/0160196 A1* | 6/2018 | Wahl | H04N 21/812 |
| 2018/0295396 A1* | 10/2018 | Ramadorai | H04N 21/2743 |
| 2018/0341705 A1* | 11/2018 | Kim | H04N 21/23439 |
| 2019/0005549 A1* | 1/2019 | Goldshtein | G06Q 30/0267 |
| 2019/0066158 A1 | 2/2019 | Choi et al. | |
| 2019/0206128 A1* | 7/2019 | Logan | G06T 13/40 |
| 2019/0370558 A1* | 12/2019 | Forsythe | G06V 20/49 |
| 2020/0007924 A1* | 1/2020 | Wu | H04N 21/44008 |
| 2021/0258654 A1* | 8/2021 | Kurzynski | H04N 21/812 |

FOREIGN PATENT DOCUMENTS

| | | |
|---|---|---|
| KR | 1020080057865 A | 6/2008 |
| KR | 1020100107138 A | 10/2010 |
| KR | 1020130105270 A | 9/2013 |
| KR | 1020190024249 A | 3/2019 |

* cited by examiner

FIG. 8

| VIDEO CHARACTERISTIC \ TYPE OF CONTENT | FIRST CONTENT | SECOND CONTENT |
|---|---|---|
| TYPE | DRAMA | ADVERTISEMENT |
| BACKGROUND COLOR | GREY | PINK |
| ... | ... | ... |

⬇

5

| VIDEO CHARACTERISTIC \ TYPE OF CONTENT | NON-ADVERTISEMENT | | | | ADVERTISEMENT |
|---|---|---|---|---|---|
| | DRAMA | NEWS | SPORTS | ... | |
| BACKGROUND COLOR | GREY | BLUE | GREEN/BROWN | ... | PINK |
| ... | ... | ... | ... | ... | ... |

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2020-0022554, filed on Feb. 24, 2020 in the Korean Intellectual Property Office, the disclosure of which is incorporated herein by reference in its entirety.

BACKGROUND

1. Field

The disclosure relates to an electronic apparatus and a control method thereof, and more particularly, to an electronic apparatus for identifying switching timing between contents and a control method thereof.

2. Description of Related Art

Content providers, such as TV broadcasting stations, are usually operated through predetermined advertisement rates collected from advertisers. Advertisement rates of tens of thousands of dollars are set for advertisements inserted before and after a broadcast program, and more expensive advertisement rates than the advertisements inserted before and after the broadcast program are set for intermediate advertisements inserted in the middle of the broadcast program. Accordingly, content providers have achieved significant profits through the advertisements.

As such, inserting advertisements into broadcast programs is advantageous for content providers in terms of revenue, but on the contrary, since a user has to watch the inserted advertisements regardless of their preferences to watch the desired broadcast programs, he/she is bound to feel uncomfortable or unpleasant when viewing the advertisements.

Accordingly, there is a need to provide an optimized content service to a user by identifying a user's preference for advertisements displayed on a TV and providing advertisements according to the user's preference.

SUMMARY

The disclosure provides an electronic apparatus capable of accurately identifying a switching timing between contents to provide an optimized content service according to user's preference for content identified based on the switching timing, and a control method thereof.

According to an aspect of the disclosure, an electronic apparatus may include an interface circuitry; a display; a memory storing one or more instructions; and a processor configured to execute the one or more instructions to: receive a broadcast signal of any one of a plurality of channels through the interface circuitry; control the display to display an image of a content based on the received broadcast signal; identify timing when the content switches from a first content to a second content having a different type than the first content based on a change in a video characteristic defined corresponding to the type of the content; and perform a first operation related to the second content based on the identified timing.

The processor may be further configured to identify the change in the video characteristic based on a change in an RGB characteristic of the displayed image defined corresponding to the type of the content.

The processor may be configured to identify the video characteristic based on recognition of an object in the displayed image.

The object in the displayed image may include one or more of a person, a logo, a brand, or a title.

The processor may be further configured to: control a speaker to output a sound of the content, and identify the switching timing based on a change in a sound characteristic defined corresponding to the type of the content.

The processor may be further configured to identify the sound characteristic based on a feedback sound detected by a microphone that receives the output sound.

The identified sound characteristic may include one or more of the type or volume of the sound.

The processor may be configured to perform a second operation based on information that is obtained through learning about the change in the video characteristic from the first content to the second content and is grouped for each type of the content.

The processor may be configured to: store information on the switching timing in the memory, and update the stored information to information on a timing different from the switching timing based on an identification that the first content switches to the second content at the timing different from the switching timing.

The processor may be further configured to identify the change in the video characteristic of the content based on information on the switching timing during a time interval including the switching timing.

The processor may be further configured to adjust the time interval to include a timing different from the switching timing when it is identified that the first content switches to the second content at the timing different from the switching timing.

The processor may be further configured to identify whether a user prefers the second content based on a user's viewing time for the second content.

The processor may be further configured to acquire information grouped for each type of the content according to whether the user prefers the second content identified based on the viewing time.

According to another aspect of the disclosure, a control method of an electronic apparatus may include receiving a broadcast signal of any one of a plurality of channels; displaying an image of a content based on the received broadcast signal; identifying timing when the content switches from a first content to a second content having a different type than the first content based on a change in a video characteristic defined corresponding to the type of the content; and performing an operation related to the second content based on the identified timing.

According to another aspect of the disclosure, a non-transitory recording medium may store program code comprising instructions for causing an electronic device to: receiving a broadcast signal of any one of a plurality of channels; displaying an image of a content based on the received broadcast signal; identifying timing when the content switches from a first content to a second content having a different type than the first content based on a change in a video characteristic defined corresponding to the type of the content; and performing an operation related to the second content based on the identified timing.

According to yet another aspect of the disclosure, an electronic apparatus, may include an interface circuitry; a speaker; a memory storing one or more instructions; and a processor configured to execute the one or more instructions to: receive a broadcast signal of any one of a plurality of channels through the interface circuitry, control the speaker to output sound a content based on the received broadcast signal, identify timing when the content switches from a first content to a second content having a different type than the first content based on a change in a sound characteristic defined corresponding to the type of the content, and perform an operation related to the second content based on the identified timing.

The processor may be configured to identify the sound characteristic based on a feedback sound detected by a microphone that receives the output sound.

The identified sound characteristic may include one or more of the type or volume of the sound.

BRIEF DESCRIPTION OF DRAWINGS

The above and other aspects, features, and advantages of certain embodiments of the present disclosure will become apparent and more readily appreciated from the following description taken in conjunction with the accompanying drawings, in which:

FIG. 8 is a diagram showing a process of learning the video characteristics defined corresponding to the type of content in relation to step S34 of FIG. 3 according to an embodiment.

DETAILED DESCRIPTION

Figure 1:
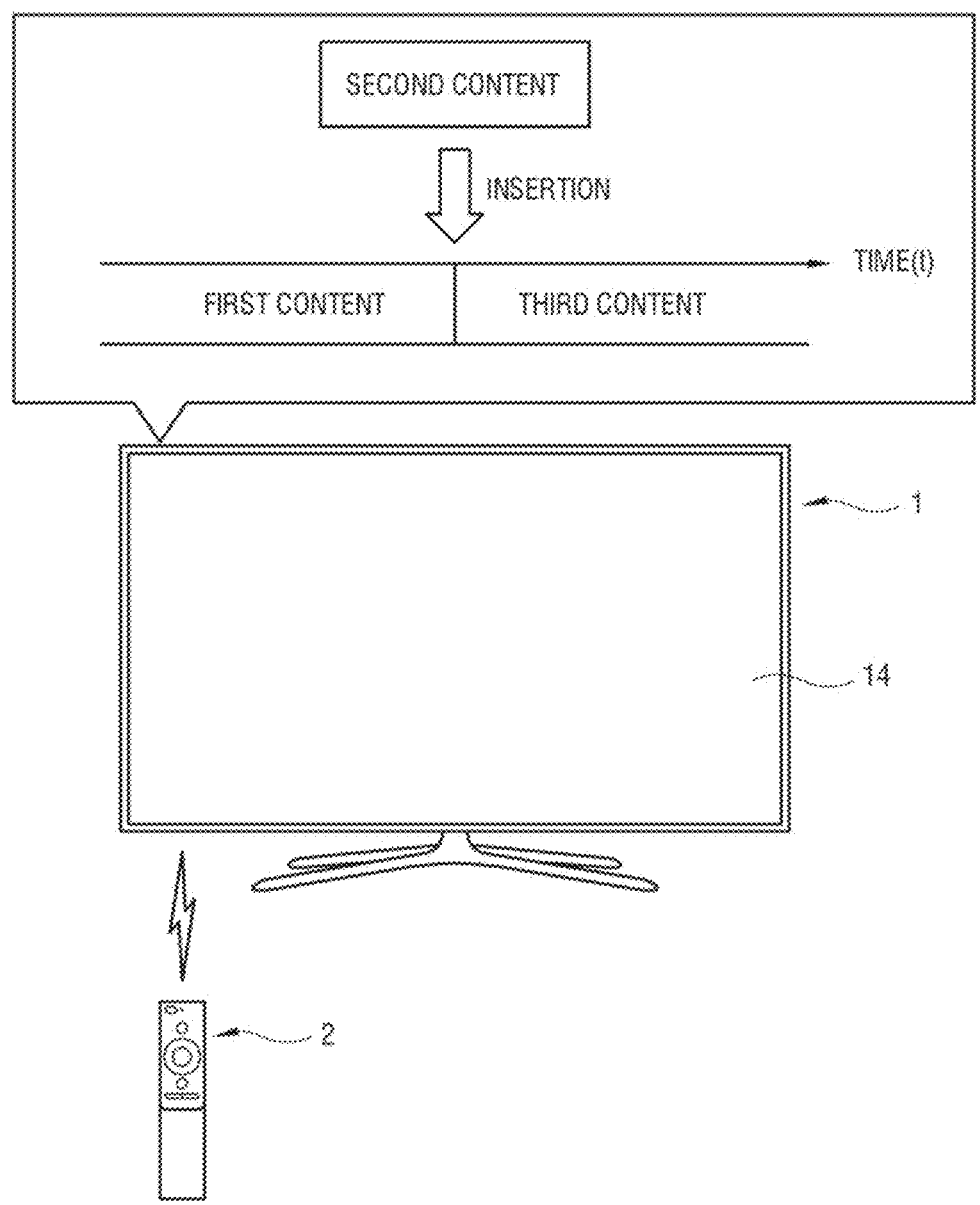
FIG. 1 is a diagram of an electronic apparatus according to an embodiment.

Hereinafter, example embodiments according to the disclosure will be described in detail with reference to the accompanying drawings. The description of the example embodiments below references matters described in the accompanying drawings, and the same reference numerals or symbols illustrated in each drawing indicate components that perform substantially the same operation. In the disclosure, at least one of a plurality of elements refers to not only all of the plurality of components, but also each one or all combinations thereof excluding the rest of the plurality of components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure.

FIG. 1 is a diagram of an electronic apparatus according to an embodiment. As shown in FIG. 1, an electronic apparatus 1 may include a display 14. The electronic apparatus 1 may display an image of content through the display 14 based on a video signal of the content. The electronic apparatus 1 may be implemented as various types of devices such as image display devices such as a television (TV), a smartphone, a tablet, a portable media player, a wearable device, a video wall, and an electronic frame, video processing devices such as a set-top box without the display 14, household appliances such as a refrigerator and a washing machine, and information processing devices such as a computer body. When the electronic apparatus 1 does not include the display 14, the electronic apparatus 1 may transmit the video signal of the content to an external TV or display. In addition, the electronic apparatus 1 may be implemented as an artificial intelligence speaker, an artificial intelligence robot, or the like which is equipped with an artificial intelligence function. However, the type of the electronic apparatus 1 is not limited thereto, but hereinafter, for convenience of description, it is assumed that the electronic apparatus 1 is implemented as a TV.

The electronic apparatus 1 may receive a video signal of content from a content provider. The content provider may include a broadcasting station that provides content based on terrestrial waves, a cable, satellite waves, and the like. In this case, the electronic apparatus 1 may receive a broadcast signal of any one of a plurality of channels from the broadcasting station. The content provider is not limited to the broadcasting station, and therefore may include a portal site, a mobile carrier, a content providing server, a content platform, and the like that provide digitized information using the Internet and the like. However, in the following, for convenience of explanation, it is assumed that the electronic apparatus 1 receives the broadcast signal of content from the broadcasting station.

The electronic apparatus 1 may display various types of content. The electronic apparatus 1 may display images of programs, such as news, current affair discussions, a documentary, a drama, comedy, a song, a movie, and sports, based on broadcast signals received from a broadcasting station. The electronic apparatus 1 may receive broadcast signals for a first content and a third content from the broadcasting station, and as shown in FIG. 1, may sequentially display the images of the first content and the third content. The first content and the third content may be displayed according to a broadcast order identified based on an electronic program guide (EPG).

In addition, the electronic apparatus 1 may display an image of an advertisement based on the broadcast signal received from the broadcasting station. The advertisement may include advertisements inserted before and after a program, and an intermediate advertisement inserted while one program is broadcast. As an example, as shown in FIG. 1, the second content may be inserted and displayed between the first content and the subsequent third content according to the broadcast order. The EPG may not be provided for the second content.

Figure 2:
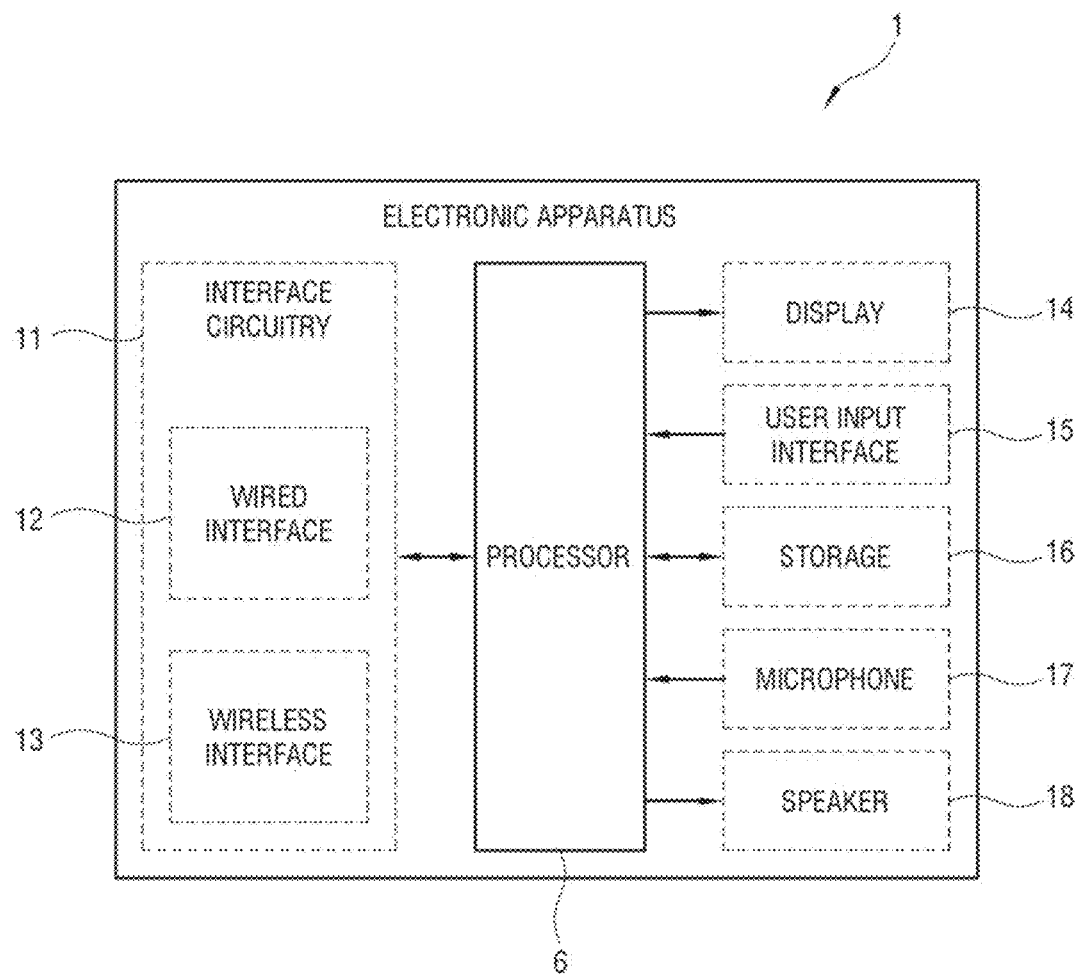
FIG. 2 is a diagram of a configuration of the electronic apparatus of FIG. 1 according to an embodiment.

FIG. 2 is a diagram showing an example of a configuration of the electronic apparatus of FIG. 1 according to an embodiment. Hereinafter, the configuration of the electronic apparatus 1 will be described in detail with reference to FIG. 2. Although the present embodiment describes the case where the electronic apparatus 1 is a TV, the electronic apparatus 1 may be implemented as various types of apparatuses, and therefore the present embodiment does not limit the configuration of the electronic apparatus 1. The electronic apparatus 1 may not be implemented as a display apparatus such as a TV. In this case, the electronic apparatus 1 may not include components for displaying an image, such as the display 14. For example, when the electronic apparatus 1 is implemented as a set-top box, the electronic apparatus 1 may output a video signal to an external TV through an interface circuitry 11.

The electronic apparatus 1 may include the interface circuitry 11. The interface circuitry 11 may include a wired interface circuitry 12. The wired interface circuitry 12 may include a connector or port to which an antenna capable of receiving broadcast signals according to broadcast standards such as terrestrial and satellite broadcasting may be connected, or a cable capable of receiving broadcast signals according to cable broadcasting standards may be connected. As another example, the electronic apparatus 1 may also include the antenna capable of receiving the broadcast signal. The wired interface circuitry 12 may include a connector, a port, or the like according to video and/or audio transmission standards, such as an HDMI port, DisplayPort, a DVI port, thunderbolt, composite video, component video, super video, and SCAR. The wired interface circuitry 12 may include a connector, a port, or the like according to a universal data transmission standard such as a USB port. The wired interface circuitry 12 may include a connector, a port, or the like to which an optical cable may be connected according to an optical transmission standard. The wired interface circuitry 12 may be connected to an external microphone or an external audio device having a microphone, and may include a connector, a port, or the like capable of receiving or inputting an audio signal from an audio device. The wired interface circuitry 12 may be connected to audio devices such as a headset, an earphone, and an external speaker, and may include a connector, a port, or the like capable of transmitting or outputting an audio signal to the audio devices. The wired interface circuitry 12 may include a connector or a port according to a network transmission standard such as the Ethernet. For example, the wired interface circuitry 12 may be implemented as a LAN card or the like which is wired to a router or a gateway.

The wired interface circuitry 12 may be wired to a set-top box, an external apparatus such as an optical media playback device, an external display apparatus, a speaker, a server, or the like through the connector or the port in a 1:1 or 1:N (N is a natural number) manner to receive video and audio signals from the corresponding external apparatus or transmit the video and audio signals to the corresponding external apparatus. The wired interface circuitry 12 may include a connector or a port for separately transmitting the video/audio signals.

According to an embodiment, the wired interface circuitry 12 may be built in the electronic apparatus 1, but may also be implemented in the form of a dongle or a module and detached from the connector of the electronic apparatus 1.

The interface circuitry 11 may include a wireless interface circuitry 13. The wireless interface circuitry 13 may be implemented in various ways corresponding to the implementation type of the electronic apparatus 1. For example, the wireless interface circuitry 13 may use wireless communications such as radio frequency (RF), Zigbee, Bluetooth, Wi-Fi, ultra-wideband (UWB), and near field communication (NFC) as a communication method. The wireless interface circuitry 13 may be implemented as a wireless communication module that performs wireless communication with an AP according to a Wi-Fi method, a wireless communication module that performs one-to-one direct wireless communication such as Bluetooth, or the like. The wireless interface circuitry 13 may wirelessly communicate with a server on a network to transmit and receive a data packet to and from at least one server. The wireless interface circuitry 13 may include an IR transmitter and/or an IR receiver capable of transmitting and/or receiving an infrared (IR) signal according to an infrared communication standard. The wireless interface circuitry 13 may receive or input a remote control signal from a remote control 2 or other external devices through the IR transmitter and/or the IR receiver, or transmit or output the remote control signal to the remote control 2 or other external devices. As another example, the electronic apparatus 1 may transmit and receive the remote control signal to and from the remote control 2 or other external devices through the wireless interface circuitry 13 of other methods such as Wi-Fi or Bluetooth.

The electronic apparatus 1 may further include a tuner for tuning the received broadcast signal for each channel when the video and audio signals received through the interface circuitry 11 are broadcast signals.

The electronic apparatus 1 may include a display 14. The display 14 may include a display panel that may display an image on a screen. The display panel may be provided as a light-receiving structure such as a liquid crystal type or a self-luminous structure such as an OLED type. The display 14 may further include additional components according to the structure of the display panel. For example, if the display panel may be a liquid crystal type, the display 14 includes a liquid crystal display panel, a backlight unit that supplies light, and a panel driving substrate that drives a liquid crystal of the liquid crystal display panel. However, the display 14 may be omitted when the electronic apparatus 1 is implemented as a set-top box and the like.

The electronic apparatus 1 may include a user input interface 15. The user input interface 15 may include various types of input interface related circuits that are provided to be manipulated by a user in order to perform user input. The user input interface 15 can be configured in various forms according to the type of the electronic apparatus 1. Examples of the user input interface 14 may include a mechanical or electronic button unit of the electronic apparatus 1, a touch pad, a touch installed on the display 213, and the like.

The electronic apparatus 1 may include a storage 16. The storage 16 may store digitized data. The storage 16 may include a nonvolatile storage that may preserve data regardless of whether the nonvolatile storage is supplied with power, and a volatile memory that may be loaded with data processed by a processor 6 and may not preserve data when the volatile memory is not supplied with power. The storage may include a flash-memory, a hard-disc drive (HDD), a solid-state drive (SSD), a read-only memory (ROM), and the like, and the memory may include a buffer, a random access memory (RAM), and the like.

The electronic apparatus 1 may include a microphone 17. The microphone 17 may receive various types of sounds, such as uttered voice from a user, noise from the surrounding environment, and sound. In addition, the microphone 17 may receive sound output from a speaker 18. The microphone 17 may transmit the received sound signal to the processor 6.

The microphone 17 may be implemented as an internal microphone provided in a main body of the electronic apparatus 1. In addition or alternatively, the microphone 17 may be implemented as an external microphone provided outside the electronic apparatus 1. The external microphone may be a standalone apparatus or a component of other electronic apparatuses. For example, the external microphone may be provided on the remote control 2 separated from the main body of the electronic apparatus 1, the smartphone, or the like. In this case, a sound signal collected through the external microphone provided in the remote control 2, the smartphone, or the like may be digitized and received through the interface circuitry 11.

The electronic apparatus 1 may include a speaker 18. The speaker 18 may output sound based on an audio signal. For example, the speaker 18 may output the sound of the content corresponding to the image of the content based on the audio signal of the content received from the broadcasting station.

The speaker 18 may be implemented as at least one speaker. The speaker 18 may be installed on the electronic apparatus 1 or may be implemented as the external speaker provided outside. In this case, the electronic apparatus 1 may transmit the audio signal to the external speaker through the interface circuitry 11.

The electronic apparatus 1 may include a processor 6. The processor 6 may include one or more hardware processors implemented as a CPU, a chipset, a buffer, a circuit, and the like that are mounted on a printed circuit board, and may be implemented as a system on chip (SOC) depending on the design method.

When the electronic apparatus 1 is implemented as the display apparatus, the processor 6 may include a video signal processor for performing video processing on the video signal of the content. The video signal processor may include a demultiplexer, a decoder, a scaler, and the like, and may be implemented as a video processing processor. The processor 6 may include an audio signal processor for performing audio processing on an audio signal. The audio signal processor may be implemented as an audio processing processor, and may include an audio digital signal processor (DSP), an amplifier, and the like.

However, since the processor 6 is not limited to being provided to include the video processing processor and the audio processing processor, according to the design method, the video processing processor or the audio processing processor may be provided in a separate configuration from the processor 6.

The processor 6 may include modules corresponding to various processing processors described above. Here, some or all of these modules may be implemented as SOC. For example, a module related to vide processing such as a demultiplexer, a decoder, and a scaler may be implemented as a video processing SOC, and an audio DSP may be implemented as a separate chipset from the SOC.

However, since the configuration of the electronic apparatus 1 is not limited to the embodiment of FIG. 2, according to the design method, some of the above-described configurations may be excluded, or configurations other than the above configuration may be included.

As an example, the electronic apparatus 1 may include a sensor unit. The sensor unit may include at least one sensor that identifies a user or detects a user's movement, location, or the like. The sensor unit may further include an image acquisition unit that captures or photographs a front surface of the electronic apparatus 1, and may identify a user based on an image acquired through the image acquisition unit, or detect the user's movement, location, or the like. The image acquisition unit may be implemented as at least one camera. However, since the sensor unit is not limited thereto, the sensor unit may include a distance sensor for detecting the user's movement, location, or the like. The distance sensor may emit, for example, infrared rays, ultrasonic waves, and the like, and may measure the user's movement, location, and the like based on the difference between the time when the infrared rays, the ultrasonic waves, and the like are emitted and the time when the infrared rays, the ultrasonic waves, and the like are reflected by the user 1 and the like and returned.

On the other hand, the processor 6 of the electronic apparatus 1 may receive a broadcast signal of any one of a plurality of channels, display an image of a content based on the received broadcast signal on the display 14, identify a point in time when the content switches from first content to second content having a different type from the first content based on a change in video characteristics defined corresponding to the type of the content, and perform an operation related to the second content based on the identified point in time. The processor 6 may perform at least a part of data analysis, processing, and generation of result information for performing each operation using at least one of machine learning, a neural network, or a deep learning algorithm as a rule-based or artificial intelligence algorithm.

For example, the processor 6 or a server processor may perform functions of a learner and a recognition unit together. The learner may perform a function of generating a learned neural network, and the recognition unit may perform a function of recognizing (or reasoning, predicting, estimating, and determining) data using the learned neural network. The learner may generate or update the neural network. The learner may acquire learning data to generate the neural network. For example, the learner may acquire the learning data from the storage 16 or the server storage or from the outside. The learning data may be data used for learning the neural network, and the neural network may be learned using data performing the above-described operation as the learning data.

Before learning the neural network using the learning data, the learner may perform a pre-processing operation on the acquired learning data, or select data to be used for learning from among a plurality of learning data. For example, the learner may process or filter the learning data in a predetermined format, or add/remove noise to process data in a form suitable for learning. The learner may generate the neural network configured to perform the above-described operation using the pre-processed learning data.

The learned neural network may be constituted by a plurality of neural networks (or layers). Nodes of the plurality of neural networks may have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

In order to perform the above-described operation, the recognition unit may acquire target data. The target data may be acquired from the storage 16 or the server storage or from the outside. The target data may be data to be recognized by the neural network. Before applying to the target data to the learned neural network, the recognition unit may perform the pre-processing operation on the acquired target data, or select data to be used for recognition from among the plurality of target data. For example, the recognition unit may process or filter the target data in a predetermined format, or add/remove noise to process data in a form suitable for recognition. The recognition unit may acquire an output value output from the neural network by applying the pre-processed target data to the neural network. The recognition unit may obtain a probability value or a reliability value along with the output value.

Figure 3:
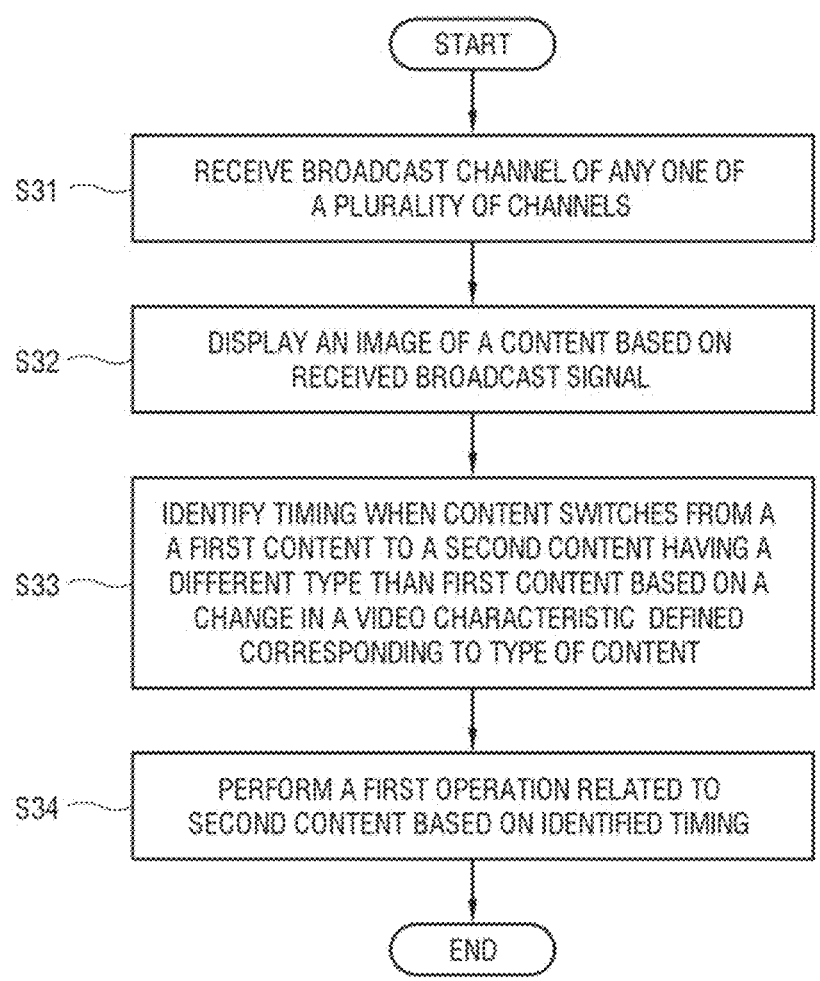
FIG. 3 is a flowchart of a control method of the electronic apparatus of FIG. 1 according to an embodiment.

FIG. 3 is a flowchart of a control method of the electronic apparatus of FIG. 1 according to an embodiment. Each operation of FIG. 3 may be executed by the processor 6 of the electronic apparatus 1. As described with reference to FIG. 1, the processor 6 may receive a broadcast signal of any one of a plurality of channels (S31), and display an image of content, such as a content stream, based on the received broadcast signal (S32).

The processor 6 may identify a timing when the content switches from the first content to the second content having a different type from the first content based on the change in the video characteristics defined corresponding to the type of the content (S33).

The processor 6 may perform the operation related to the second content based on the identified timing (S34).

In this way, the processor 6 may accurately identify the switching timing of the content based on the change in the video characteristics defined corresponding to the types of contents in the content stream, and thus may provide the optimized content service according to the user's preference for the content identified based on the switching timing.

Figure 4:
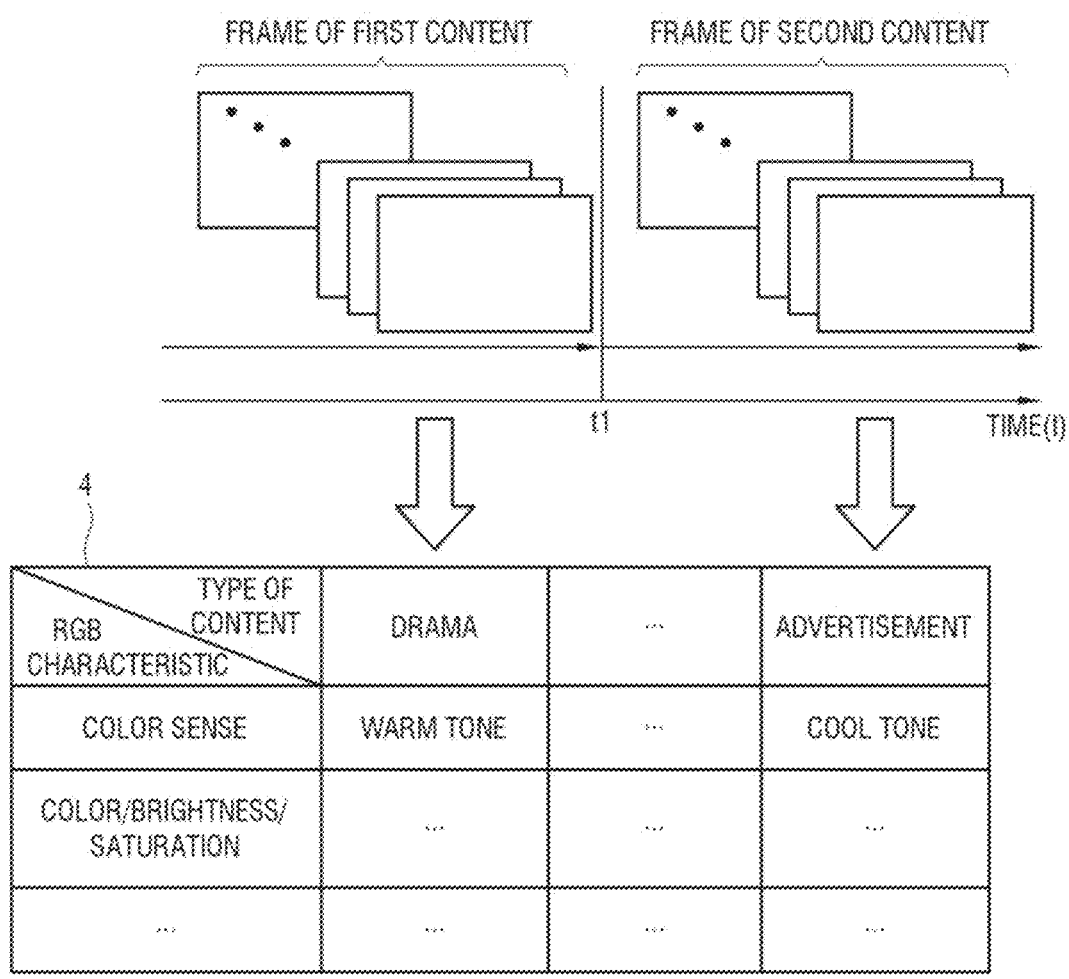
FIG. 4 is a diagram showing a process of identifying whether to switch between contents based on a change in RGB characteristics in relation to step S33 of FIG. 3 according to an embodiment.

FIG. 4 is a diagram showing a process of identifying whether to switch between contents based on a change in RGB characteristics in relation to step S33 of FIG. 3 according to an embodiment. The processor 6 may display images of the first content and the second content on the display 14 based on a broadcast signal received from a content provider such as a broadcasting station. It is assumed that the first content and the second content are sequentially displayed.

The processor 6 may identify RGB characteristics of at least one image frame among the images of the first content and the second content. As shown in FIG. 4, the images of the first content and the second content may include a plurality of image frames. The processor 6 may acquire at least one of a plurality of image frames of each of the first content and the second content, and identify the RGB characteristics of the acquired at least one image frame. For example, the processor 6 may capture an image of each content displayed on the display 14 and identify RGB characteristics of the captured image frame. The RGB characteristics may be identified, for example, through histogram analysis of the frames of each content, but is not limited thereto, and the processor 6 may identify the RGB characteristics through various video processing according to a design method.

The processor 6 may identify a color sense of the first content as a warm tone as a result of identifying the RGB characteristics of at least one image frame of the first content, and may identify a color sense of the second content as a cool tone as a result of identifying the RGB characteristics of at least one of the plurality of image frames of the second content. However, since the RGB characteristics are not limited to the color sense, the processor 6 may identify the RGB characteristics of the content according to various factors representing the RGB characteristics such as color, brightness, and saturation.

The processor 6 may identify the color senses of each of the first content and the second content as the warm tone and the cool tone, and identify that the color sense between the first content and the second content is changed from the warm tone to the cool tone. That is, the processor 6 may identify whether to switch between the first content and the second content through a change in the color sense.

As described above, since the RGB characteristics may be identified with a small amount of computation such as histogram analysis, the processor 6 may efficiently utilize resources in identifying whether to switch between contents.

The processor 6 may identify the change in RGB characteristics by referring to an RGB characteristic table 4 indicating the predetermined RGB characteristics for each type of content. The RGB characteristic table 4 may be stored in the storage 16 in the form of a look-up table, but is not limited thereto, and thus may be received from an external server or other electronic apparatuses.

In the RGB characteristic table 4, as shown in FIG. 4, the content may be classified by each type. For example, the type of content may be classified into a non-advertisement and an advertisement such as drama and news. In addition, in the RGB characteristic table 4, unique RGB characteristics corresponding to the type of content may be grouped according to various RGB characteristic factors. For example, in relation to factors of the color sense among RGB characteristics, a color sense of a drama among non-advertisements may be a warm tone, while a color sense of an advertisement may be a cool tone. However, since the disclosure is not limited thereto, various RGB characteristic factors may be included in the RGB characteristic table 4 according to the design method, and unique RGB characteristics corresponding to the type of content may be grouped for each RGB characteristic factor.

The processor 6 may identify the type of the first content identified as having a warm tone as a drama by referring to the RGB characteristic table 4, and identify the type of the second content identified as having the cool tone as the advertisement. That is, the processor 6 may identify that the type of the content is changed from the drama to the advertisement through the change in the RGB characteristics.

As described above, since the processor 6 may identify the change in the RGB characteristics by referring to the RGB characteristic table 4, it is possible to efficiently utilize the resources and more easily identify whether to identify between contents.

As another embodiment, the processor 6 may identify whether to switch between the first content and the second content based on the change in the RGB characteristics, and may identify first switching timing t1 between the first content and the second content. The processor 6 may additionally perform various operations or processing to improve the identification accuracy for the first switching timing t1. For example, the processor 6 may additionally identify whether or not the video characteristics of the first content and the second content identified as having the change in the RGB characteristics change. Hereinafter, by additionally identifying whether there is the change in the video characteristics of the first content and the second content identified as having the change in the RGB characteristics, the process of more accurately identifying the first switching timing t1 will be described with reference to FIGS. 5 to 7.

Figure 5:
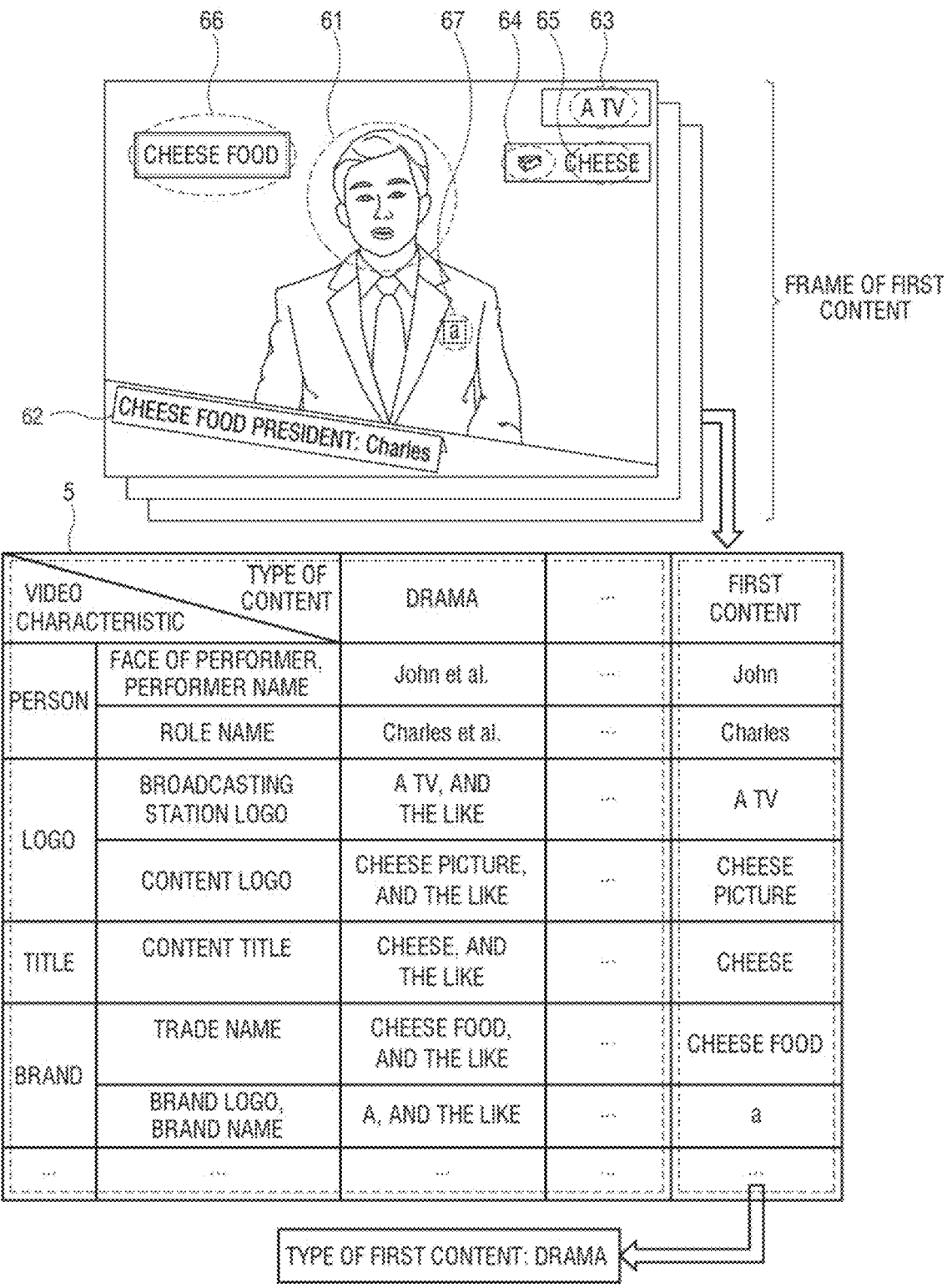
FIG. 5 is a diagram showing a process of identifying a type of content based on video characteristics of content in relation to step S33 of FIG. 3 according to an embodiment.

FIG. 5 is a diagram showing a process of identifying a type of content based on the video characteristics of the content in relation to step S33 of FIG. 3 according to an embodiment. As described with reference to FIG. 4, the processor 6 may identify the video characteristics of the images of the first content and the second content identified as having the change in the RGB characteristics. As an example, as shown in FIG. 5, the processor 6 may identify the video characteristics of the image frame of the first content.

The video characteristics may include various factors of objects included in the captured image, for example, a person, a logo, a title, a brand, and the like. The person factor may not only include a form, a shape, and the like of a face of a performer itself in the image, but may also include a body shape, a physique, a silhouette, a shadow, unique body features or poses, and the like of a performer. In addition, the person factor may not only include a name or nickname on a role, but may also include an actual name or nickname of the performer. The logo factor may include a broadcasting station logo representing a content provider such as a broadcasting station, a content logo for identifying content itself, or the like, and the title factor may include the title of the content itself. The brand factor may include, for example, a business brand, an automobile brand, a clothing brand, and the like exposed in an image. However, since the disclosure is not limited thereto, the video characteristics may include various factors.

The processor 6 may identify the video characteristics of the first content through a recognition method such as optical character recognition and optical object recognition with respect to the image frame of the first content. However, since the disclosure is not limited to the optical recognition method, the processor 6 may identify the video characteristics in various ways according to the design method.

As an example, as shown in FIG. 5, the processor 6 may perform the optical recognition on the image frame of the first content, and thus, identify that in relation to the person factor of the video characteristics of the first content, a performer name 61 is "John" and the role name 62 is "Charles". In addition, it may be identified that in relation to the logo factor, the broadcasting station logo 63 is "A TV", and the content logo 64 is "cheese picture", and in relation to the title factor, the content title 65 is "cheese". In addition, a trade name 66, a brand logo, or a brand name 67 may be identified in relation to the brand factor.

The processor 6 may identify the type of the first content by referring to the video characteristic table 5. In the video characteristic table 5, the characteristics of videos that are predefined corresponding to the type of the content may be grouped for each type of the content. The video characteristic table 5 may be stored in the storage 16 in the form of the look-up table, but is not limited thereto, and thus may be received from an external server or other electronic apparatuses.

As shown in FIG. 5, in the case of a drama, the video characteristic table 5 may include "John" as the performer name, "Charles" as the role name, and the like, in relation to the person factor of the video characteristics. In addition, in relation to the logo factor, the "A TV" may be included as the broadcasting station logo, the "cheese picture" or the like may be included as the content logo, and the "cheese" and the like may be included as the content title in relation to the title factor.

The processor 6 may compare the video characteristics identified from the image of the first content and the video characteristics of the video characteristic table 5 for each factor. As an example, the processor 6 may identify that the face or name "John" of the performer identified from the image of the first content is included in the face or name of the performer of the video characteristic table 5 in relation to the person factor, and the role name "Charles" identified from the image of the first content is included in the role name of the video characteristic table 5. Similarly, the processor 6 may identify that the video characteristics identified from the image of the first content in relation to a logo, a title, a brand factor, etc., are included in the video characteristics of the video characteristic table 5. The processor 6 may identify that the type of the first content is a drama through the comparison between the two video characteristics.

The processor 6 may assign different weights to each factor. For example, assuming that most of the weights are assigned to the person factor and the remaining weights are separately assigned to other factors, the processor 6 may identify that the type of the first content is, for example, a drama when the video characteristics are identical or included in relation to the person factor even if the video characteristics are not identical or not included in relation to the remaining factors. However, the weights assigned to each factor may be provided in various ways according to the design method.

As described above, since the processor 6 may identify the type of the first content by referring to the video characteristic table 5, it is possible to improve the identification accuracy for the type of the first content.

Figure 6:
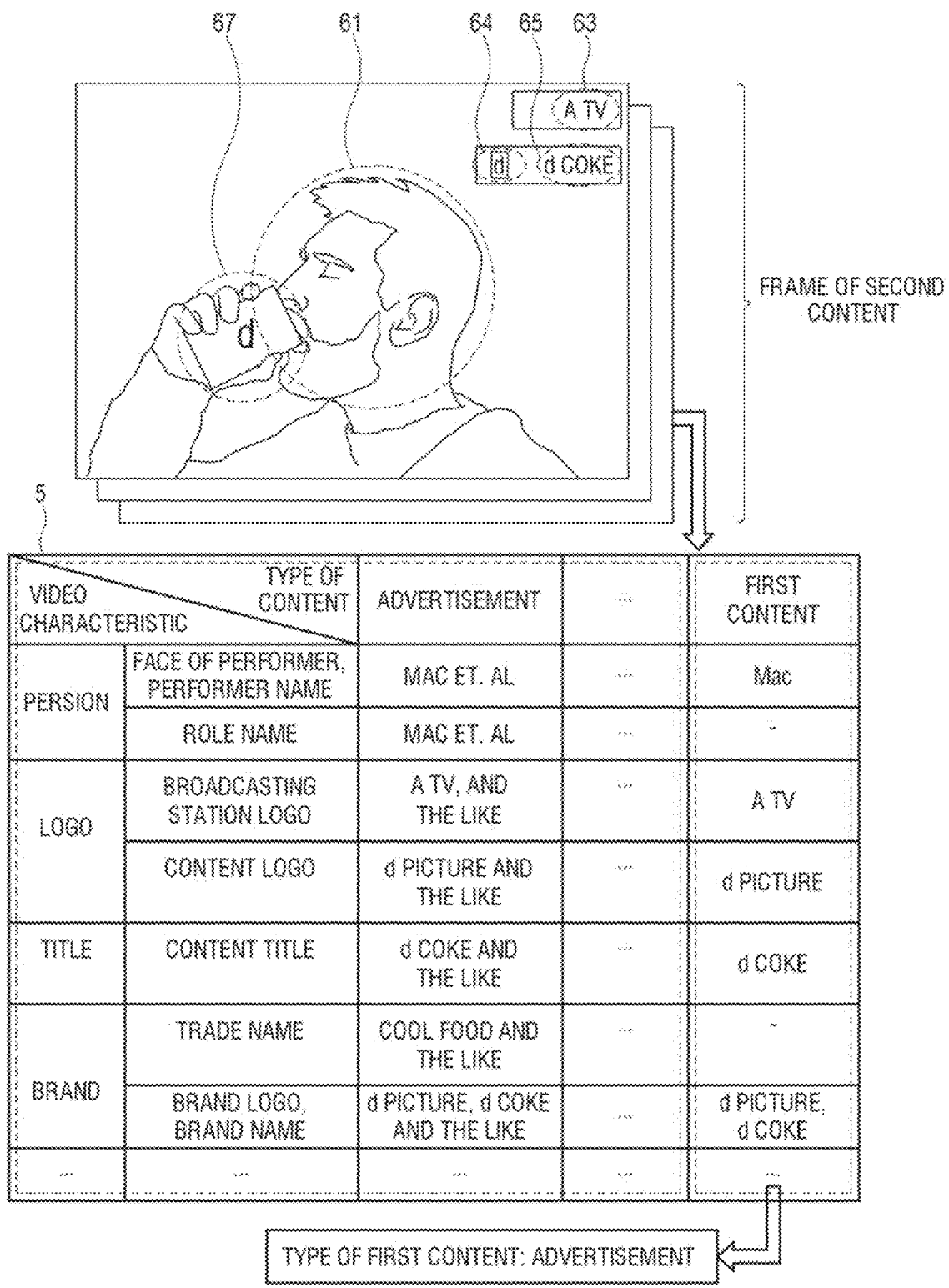
FIG. 6 is a diagram showing a process of identifying the type of content based on the video characteristics of content in relation to step S33 of FIG. 3 according to an embodiment.

FIG. 6 shows another example of identifying the type of content based on the video characteristics of content in relation to step S33 of FIG. 3 according to an embodiment. An example of identifying a type of non-advertisements such as a drama based on the image of the first content has been described with reference to FIG. 5, but hereinafter, an example of identifying an advertisement based on the image of the second content will be described in detail with reference to FIG. 6. However, for convenience of explanation, excluding the overlapping portions of the description in FIG. 5, the description will focus on different portions.

As described with reference to FIG. 4, the processor 6 may identify the video characteristics of the image of the second content identified as having the change in the RGB characteristics. The processor 6 may perform optical character recognition, optical object recognition, etc., on the image frame of the second content, and thus identify that the performer name 61 is "Mac" in relation to the person factor of the video characteristics of the second content. In addition, the processor 6 may identify that in relation to the logo factor, the broadcasting station logo 63 is "A TV", and the content logo 64 is a picture with alphabet "d", and in relation to the title factor, the content title 65 is "d coke". In addition, the trade name 66, the brand logo, or the brand name 67 may be identified in relation to the brand factor.

The processor 6 may identify the type of the second content by referring to the video characteristic table 5. As shown in FIG. 6, in the case of the advertisement, the video characteristic table 5 may include "Mac" or the like as the performer name and the role name, and the like in relation to the person factor of the video characteristics. In addition, in relation to the logo factor, the "A TV" or the like may be included as the broadcasting station logo and the picture with alphabet "d" or the like may be included as the content logo, and in relation to the title factor, the "d coke" or the like may be included as the content title.

The processor 6 may identify whether the video characteristics identified from the image frame of the second content and the video characteristics of the video characteristic table 5 are identical or included for each factor. For example, the processor 6 may identify that the face or name "Mac" of the performer identified from the image of the second content is included in the face or name of the performer 5 of the video characteristic table 5 in relation to the person factor. Similarly, the processor 6 may identify that the video characteristics identified from the image of the second content in relation to the logo, the title, the brand factor, etc., are included in the video characteristics of the video characteristic table 5. The processor 6 may identify that the type of the second content is an advertisement through the comparison between the two video characteristics.

On the other hand, the processor 6 may assign different weights to each factor. For example, even if the video characteristics are not identical or not included in relation to the remaining factors, when the video characteristics are identical or included in relation to the person factors, the processor 6 may identify that the type of the second content is the advertisement.

As described above, since the processor 6 may identify the type of the second content by referring to the video characteristic table 5, it is possible to improve the identification accuracy for the type of the second content.

As described with reference to FIGS. 5 and 6, the processor 6 may identify the types of the images of the first content and the second content identified as having the change in the RGB characteristics according to the video characteristics, thereby improving the identification accuracy for the type of image. As a result, the processor 6 may accurately identify the first switching timing t1 to be switched from the first content to the second content.

In other words, as described with reference to FIG. 1, when the second content is inserted between the third content and the first content, while the third content is broadcast after the first content according to the broadcast order, the processor 6 may accurately identify not only the first switching timing t1 when the content is switched from the first content to the second content, but also the second switching timing t2 when the content is switched from the second content to the third content. That is, the processor 6 can accurately identify the advertisement time of the second content, which is an advertisement, based on the first switching timing t1 and the second switching timing t2.

Figure 7:
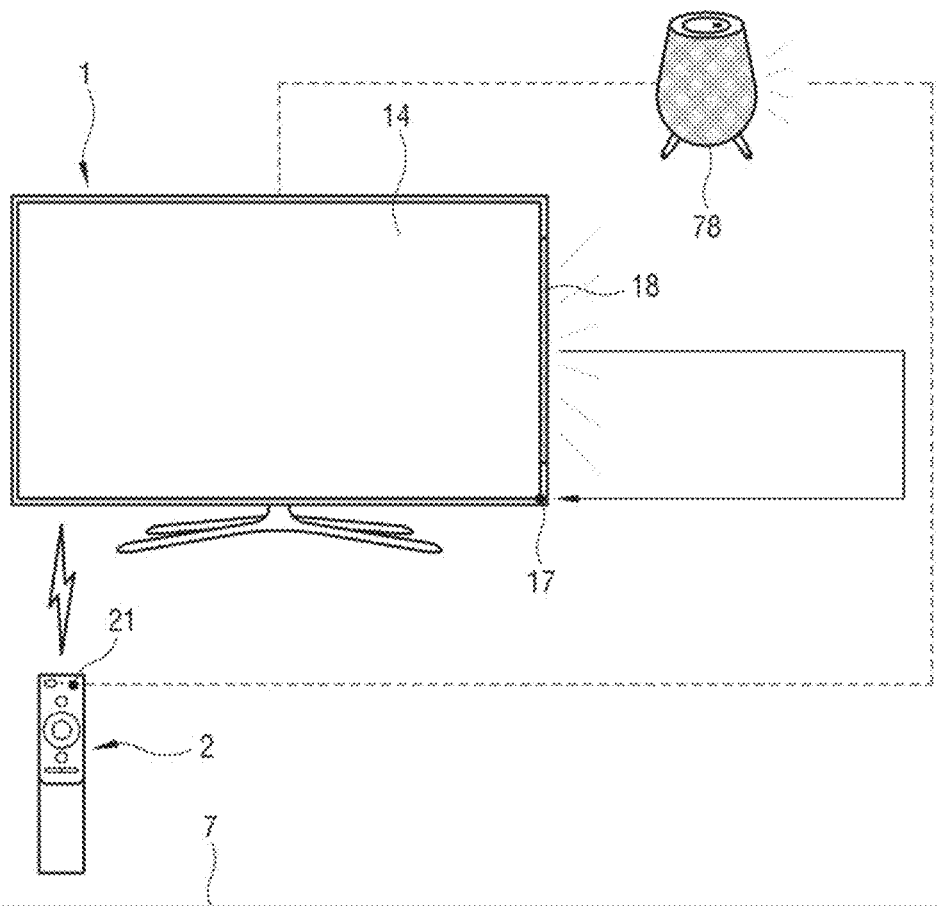
FIG. 7 is a diagram showing a process of identifying a type of content based on the sound characteristics of content in relation to step S33 of FIG. 3 according to an embodiment.

FIG. 7 shows an example of identifying a type of content based on the sound characteristics of content in relation to step S33 of FIG. 3 according to an embodiment. The processor 6 may control a speaker 18 to output the sound of the content corresponding to the image of the content based on the audio signal of the content. The speaker 18 may be built into the electronic apparatus 1, but is not limited thereto, and thus the sound of the content may be output through an external speaker 78. However, hereinafter, for convenience of explanation, it is assumed that the sound of the content is output through the built-in speaker 18.

Further, the processor 6 may receive the sound signal output from the speaker 18 through the microphone 17 built in the electronic apparatus 1, but is not limited thereto, and the sound signal may be received through a microphone 21 provided on the remote control 2 or a microphone provided on a smartphone. However, hereinafter, for convenience of explanation, it is assumed that a sound signal is received through the built-in microphone 17.

The processor 6 may identify the sound characteristics of the content based on the sound signal received through the microphone 17. The sound characteristics may include various factors such as a background sound, a decibel, and a size included in the sound of the content. The background sound factor may include a type of background sound included in the sound of the content, a duration, and whether or not narration is inserted during the playback of the background sound, and the like. The decibel factor may include maximum, minimum, average decibels of the background sound, the number of times of changes in decibels, and the like. However, since the disclosure is not limited thereto, the sound characteristics may include various factors.

The processor 6 may identify the sound characteristics by performing various sound processing techniques on the sound signal received through the microphone 17. When performing the sound processing, the processor 6 may use various algorithms for sound recognition, for example, a sound recognition model. The sound recognition model may include a hardware/software component for sound recognition of a sound signal, and may include, for example, an acoustic model implemented through statistical modeling of sound according to algorithms such as hidden Markov model (HMM) and dynamic time warping (DTW), a language model implemented through collection of corpus (a collection of data collected in a form that a computer may process, and analyze text for language research), and the like.

Through the sound processing of the sound signal of the content, the processor 6 may identify that a duration is "1 minute 30 seconds or more" and a narration is "not inserted", in relation to the background sound factor of the sound characteristics of the first content. In addition, the processor 6 may identify that the maximum decibel reaches "F decibel" and the number of times of changes in decibels is "a predetermined number of times or more", in relation to the decibel factor. On the other hand, the processor 6 may identify that the duration is "less than 1 minute 30 seconds" and the narration is "inserted" in relation to the background sound factor of the sound characteristics of the second content. In addition, the processor 6 may identify that the maximum decibel reaches "G decibel" and the number of times of changes in decibels is "a predetermined number of times or less", in relation to the decibel factor.

The processor 6 may identify a type of content by referring to a sound characteristic table 7 in which the sound characteristics corresponding to the type of the content is predefined for each factor. The sound characteristic table 7 may be stored in the storage 16 in the form of the look-up table, but is not limited thereto, and thus may be received from an external server or other electronic apparatuses.

As shown in FIG. 7, in the case of the drama, the sound characteristic table 7 may be provided with a duration of "1 minute and 30 seconds or more" and a narration "not inserted", in relation to the background sound factor of the sound characteristics. In addition, the sound characteristic table 7 may be provided with the maximum decibel that reaches "F decibel" and the number of times of changes in decibels which is "a predetermined number of times or more", in relation to the decibel factor. On the other hand, in the case of the advertisement, the sound characteristic table 7 may be provided with the duration of "less than 1 minute 30 seconds" and the narration "inserted", in relation to the background sound factor of the sound characteristics of the second content. In addition, the sound characteristic table 7 may be provided with the maximum decibel that reaches "G decibel" and the number of times of changes in decibels which is "a predetermined number of times or less", in relation to the decibel factor.

The processor 6 may compare the sound characteristics identified from the sound signal of the first content and the sound characteristics of the sound characteristic table 7 for each factor. For example, the processor 6 may identify that in relation to the background sound factor, "1 minute 30 seconds" as the duration of the first content corresponds to "1 minute 30 seconds" as the duration of the background sound of the drama in the sound characteristic table 7, and "less than 1 minute 30 seconds" as the duration identified from the sound of the second content corresponds to "less than 1 minute 30 seconds" of the background sound of the advertisement in the sound characteristic table 7. The processor 6 may identify that the type of the second content is an advertisement through the comparison between the two video characteristics. The processor 6 may assign different weights to each factor, and the weights assigned to each factor may be provided in various ways according to a design method.

As described above, since the processor 6 may identify the types of the first content and the second content by referring to the sound characteristic table 7, it is possible to improve the identification accuracy for each content.

As described with reference to FIG. 7, the processor 6 may identify the types of the images of the first content and the second content identified as having the change in the RGB characteristics according to the sound characteristics, thereby improving the identification accuracy for the type. Accordingly, the processor 6 may not only accurately identify the first switching timing t1 when the content is switched from the first content to the second content, but may also accurately identify the second switching timing t2 when the content is switched from the second content to the third content in the same way.

FIG. 8 is a diagram showing an example of learning the video characteristics defined corresponding to the type of content in relation to step S34 of FIG. 3 according to an embodiment. Hereinafter, a process in which the processor 6 learns video characteristics will be described in detail with reference to FIG. 8 on the assumption that the type of the first content is identified as the drama and the type of the second content is identified as the advertisement.

As described with reference to FIG. 5, the processor 6 may identify that the type of the first content is the drama. In this case, the processor 6 may identify the video characteristics of the first content identified as the drama. For example, in relation to the background color factor of the first content, the processor 6 may identify that the type of the background color is "grey" and that the background color is "unchanged" for a predetermined period of time. The processor 6 may identify video characteristics related to a background color factor by performing optical recognition or the like.

When newly identifying the video characteristics related to the background color factor, the processor 6 may, for example, identify whether there is a factor related to the background color corresponding to the drama in the video characteristic table 5. If there is a factor related to the background color corresponding to the drama, the processor 6 may reflect the type of the background color as "grey" in the video characteristics related to the factor, or may reflect that whether the background color is changed for a predetermined period of time is "unchanged". On the other hand, when there is no factor related to the background color corresponding to the drama, the processor 6 adds the background color factor as a new factor corresponding to the drama to the video characteristic table 5, and may reflect that the type of the background color corresponding to the drama is "grey" or reflect that whether the background color is changed for a predetermined period of time is "unchanged".

As another example, as described with reference to FIG. 6, when the processor 6 identifies that the type of the second content is the advertisement, the processor 6 may identify that the type of the background color of the second content is "pink", and may identify that the background color is "changed a lot" for a predetermined period of time. If there is a factor related to the background color corresponding to the advertisement in the video characteristic table 5, the processor 6 may reflect the type of the background color as "pink" in the video characteristics related to the factor, or that whether the background color is changed for a predetermined period of time is "changed a lot". On the other hand, when there is no factor related to the background color corresponding to the advertisement, the processor 6 adds the background color factor as a new factor corresponding to the advertisement to the video characteristic table 5, and may reflect that the type of the background color corresponding to the advertisement is "pink" or reflect that whether the background color is changed for a predetermined period of time is "changed a lot".

Even in the case of the sound characteristics, when there are sound characteristics newly identified from the sound signals of the first content identified as the drama and the second content identified as the advertisement, the sound factor or the sound characteristics corresponding to each drama or advertisement may be added to or reflected to the sound characteristic table 7.

As described above, since the processor 6 may actively learn the video characteristics or sound characteristics of the content, it is possible to adaptively identify more various types of content.

Figure 9:
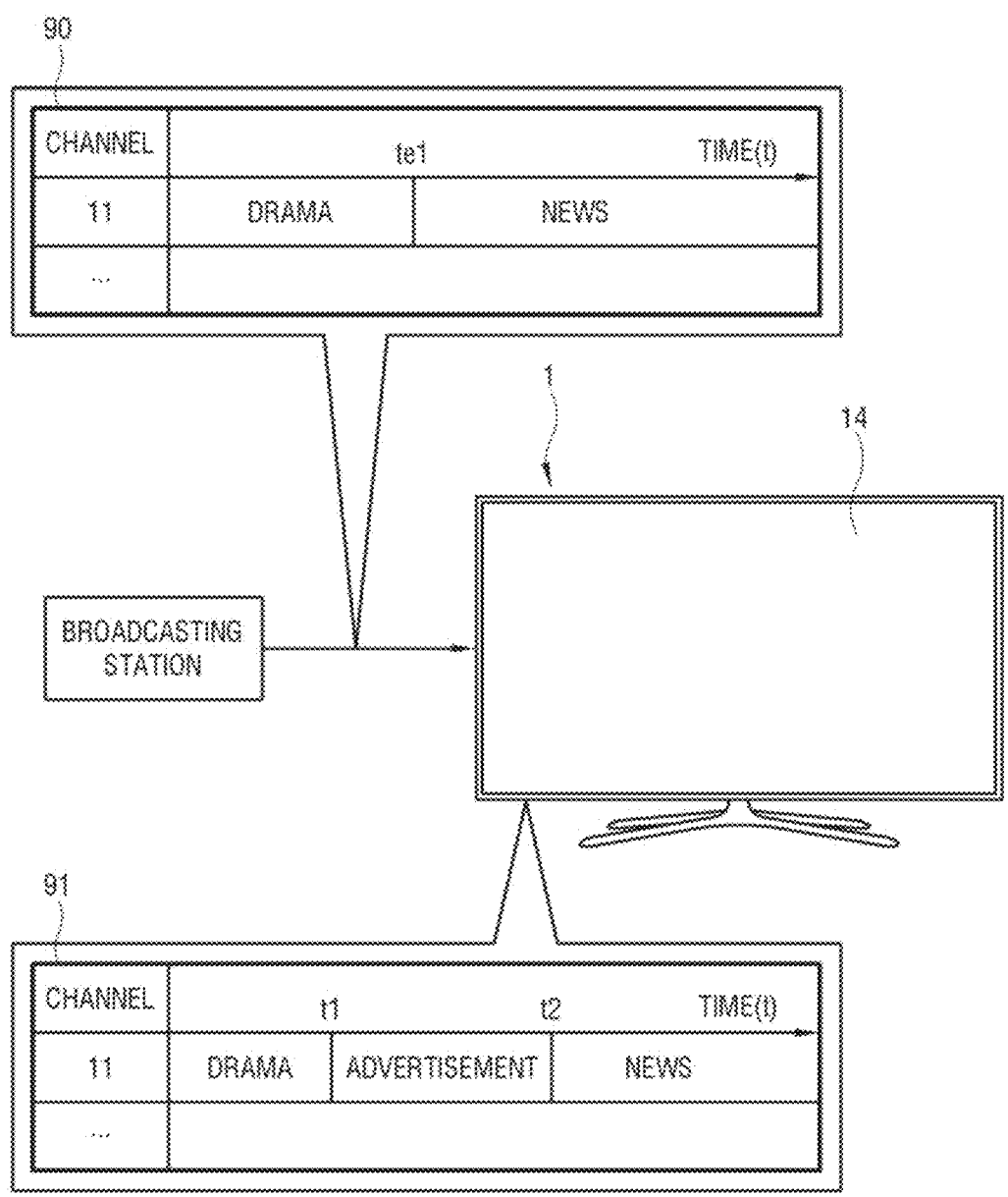
FIG. 9 is a diagram showing a process of identifying a switching timing between contents in relation to step S33 of FIG. 3 according to an embodiment.

FIG. 9 is a diagram showing an example of identifying a switching timing between contents in relation to step S33 of FIG. 3 according to an embodiment. The processor 6 may control the display 14 to display, for example, the image of the content based on the broadcast signal received from the broadcasting station. The broadcast signal may include not only the video signal and the audio signal of the content, but also an EPG 90 which is information related to the content. The EPG 90 may include information related to content, for example, information on a channel, a title, a start/end time, etc., and the processor 6 may include the channel, the title, the start/end, and the like related to the content based on the EPG 90. However, since the disclosure is not limited thereto, the EPG 90 may include various information related to the content.

As shown in FIG. 9, the processor 6 may identify an expected switching timing te1 when a drama, which is a program, is changed to news, based on the EPG 90. The expected switching timing te1 may be identified based on the information on the program start/end time obtained from the EPG 90. The EPG 90 may not include the information on the advertisement, for example, information on whether to insert a before-and-after advertisement or an intermediate advertisement, and the information on the start/end time of the advertisements. Accordingly, the first switching timing t1 when the drama is switched to the advertisement due to the advertisement inserted between the drama and the news as the program, and the second switching timing t2 when the advertisement is switched to the news may be different from the expected switching timing te1.

In consideration of this point, the processor 6 may identify the change in the video characteristics of the content displayed on the display 14, and identify the switching timing between contents based on the change in the identified video characteristics. That is, the processor 6 may identify the type of the content according to the video characteristics of the image frame of the content with the change in the RGB characteristics, and identify the switching timing between the types of content, for example, the first switching timing t1 when the drama is switched to the advertisement and the second switching timing t2 when the advertisement is switched to the news based on the change in the video characteristics of the content.

The processor 6 may generate a switching timing table 91 including the information on the identified switching timing. The switching timing table 91 may be stored in the storage unit 16 in the form of a lookup table. The switching timing table 91 may be provided to include the information on the switching timing between programs and advertisements for each content provider, or may be provided to include the information on the switching timing between programs and advertisements for each channel. The processor 6 may provide the switching timing table 91 to the content provider or other electronic apparatuses.

As another embodiment, the switching timing table 91 may be generated and provided by other electronic apparatuses. The processor 6 may update the previously stored switching timing table based on the switching timing table 91 received from the electronic apparatus.

In this way, the processor 6 may directly identify, for example, the first switching timing t1 when a drama displayed on the display 14 is switched to an advertisement and the second switching timing t2 when an advertisement is switched to news, so it is possible to improve the identification accuracy of the switching timing, and create the environment in which the related operations may be performed based on the identification accuracy of the switching timing.

Hereinafter, a process of identifying switching timing based on a time block tb for more efficient resource utilization and improved identification accuracy in relation to the identification of the switching timing will be described in detail with reference to FIG. 10.

Figure 10:
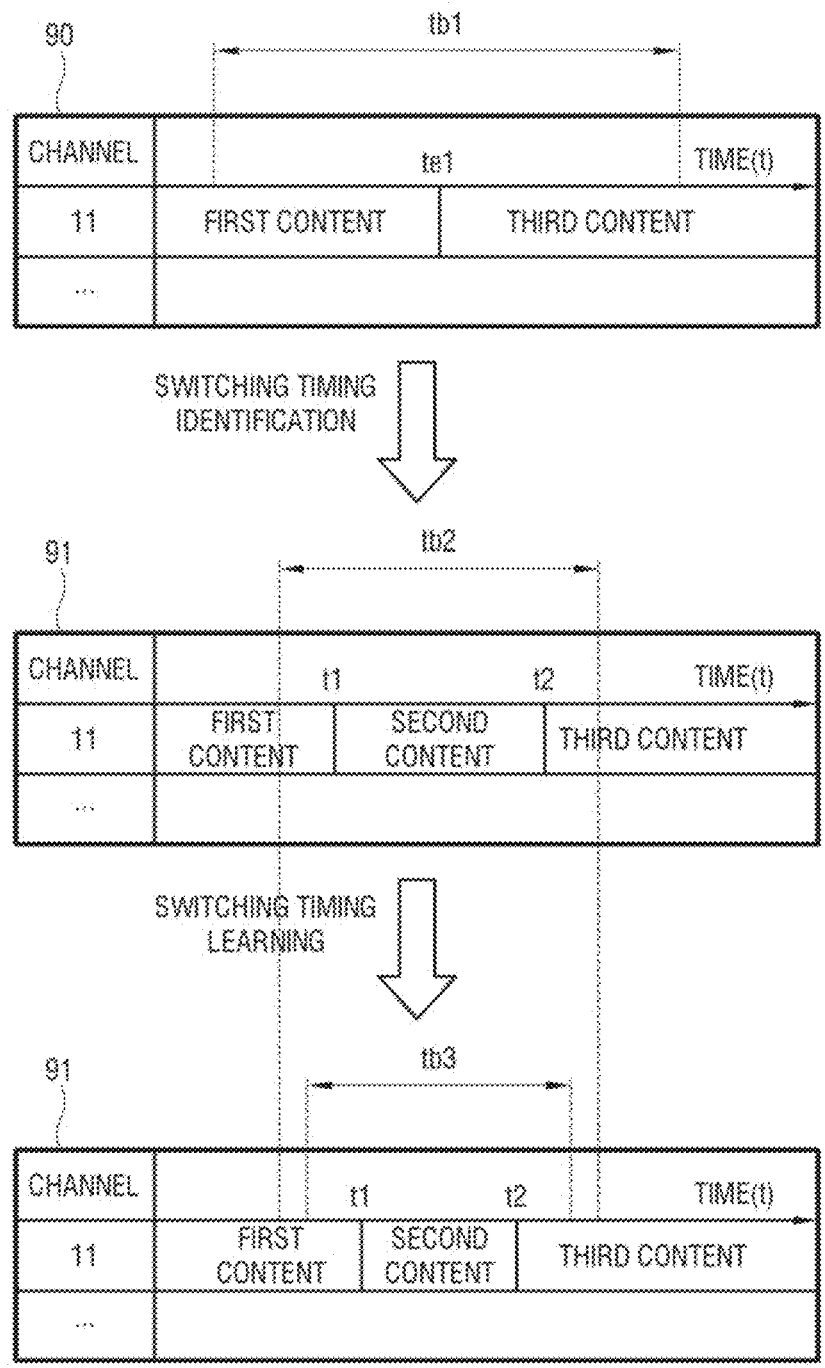
FIG. 10 is a diagram showing a process of identifying the switching timing based on a time block in relation to step S33 of FIG. 3 according to an embodiment.

FIG. 10 is a diagram showing an example of identifying the switching timing based on the time block in relation to step S33 of FIG. 3 according to an embodiment. As shown in FIG. 10, the time block tb may represent a time interval at which the processor 6 identifies the switching timing between contents. That is, the processor 6 may identify the RGB characteristics of the content from a start point of the time block tb to an end point of the time block tb.

More specifically, the processor 6 may set a predetermined time interval including the expected switching timing te1 as a first time block tb1. The expected switching timing te1 may mean timing when it is expected to switch from the first content to the third content according to the EPG 90, as described with reference to FIG. 9. Here, the first content and the third content may include a program such as a drama, news, or movie. When the first time block tb1 is initially set, the processor 6 may set the first time block tb1 to have a predetermined time interval including the expected switching timing te1. The time interval according to the first time block tb1 may be variously set according to a design method. However, in the following, for convenience of explanation, it is assumed that the first time block tb1 is set for each 20 minutes before and after the expected switching timing te1.

When the first time block tb1 is set, the processor 6 may display the image of the first content on the display 14, and when the start time of the first time block tb1 arrives, as described with reference, the processor may identify the RGB characteristics from the image frame of the first content corresponding to the start time of the first time block tb1 to the image frame of the third content corresponding to the end time of the first time block tb1. During the first time block tb1, the processor 6 may identify the change in the RGB characteristics due to the switching from the first content to the second content while identifying the RGB characteristics of the image frame or identify the change in the RGB characteristics due to the switching from the second content to the third content.

As described with reference to FIGS. 5 and 6, for the image frame of the first content, the second content, and the third content identified as having the change in the RGB characteristics during the first time block tb1, the processor 6 may identify the video characteristics. The processor 6 may identify the types of the first content, the second content, and the third content based on the video characteristics of the first content, the second content, and the third content, and identify whether to switch the first content, the second content, and the third content based on whether the identified type is changed. The processor 6 may identify the first switching timing t1 between the first content and the second content based on whether to switch between the first content, the second content, and the third content, and the second switching timing t2 between the second content and the third content.

In some cases, when the processor 6 identifies the first switching timing t1 and the second switching timing t2 during the set first time block tb1 from the EPG 90 with reference to the expected switching timing te1, as described with reference to FIG. 9, the processor may generate the switching timing table 91 indicating the identified first switching timing t1 and second switching timing t2.

In this way, the processor 6 may set the first time block tb1 by referring to the expected switching timing te1 from the EPG 90, and identify the switching timing between contents based on the change in the RGB characteristics and the change in the video characteristics during the first time block tb1. Accordingly, the processor 6 may more efficiently utilize resources and improve identification accuracy in relation to the identification of the switching timing between contents.

As another embodiment, the processor 6 may set a predetermined time interval including the first switching timing t1 and the second switching timing t2 identified during the first time block tb1 to be the second time block tb2. The second time block tb2 may have a shorter time interval than the first time block tb1 having a time interval of 20 minutes before and after the predicted switching timing te1. As an example, the second time block tb2 is a shorter time interval than the first time block tb1, and may have a time interval that corresponds to the previous 5 minutes based on the first switching timing t1 and the next 5 minutes based on the second switching timing t2. However, since the disclosure is not limited thereto, the second time block tb2 may have various time intervals according to a design method.

As described above with respect to the first time block tb1, the processor 6 may identify whether the RGB characteristics are changed during the second time block tb2, and identify the video characteristics of the image frames of the first content, the second content, and the third content identified as having the change in the RGB characteristics. The processor 6 may identify a switch between the first content, the second content, and the third content based on whether the video characteristics between the first content, the second content, and the third content are changed, and may identify the first switching timing t1 between the first content and the second content and the second switching timing t2 between the second content and the third content.

In some cases, the processor 6 may identify whether the first switching timing t1 and the second switching timing t2 identified during the second time block tb2 and the first switching timing t1 and the second switching timing t2 identified during the first time block tb1 are identical. If the respective switching timings are not identical, for example, the first switching timing t1 and the second switching timing t2 identified during the second time block tb2 may be reflected in the switching timing table 91.

In this way, the processor 6 may set the second time block tb2 based on the identified switching timing during the first time block tb1, and identify the switching timing during the second time block tb2, and thus, compared to the case of identifying the switching timing between contents during the first time block tb1, it is possible to more efficiently utilize resources and improve the identification accuracy.

As another embodiment, the processor 6 may learn the switching timing. Referring to the example described above with respect to the setting of the second time block tb2, when the processor 6 identifies the first switching timing t1 and the second switching timing t2 during the second time block tb2, the processor 6 may reset a predetermined time interval including the identified first switching timing t1 and second switching timing t2 to be a third time block tb3. The third time block tb3 may have a time interval shorter than that of the second time block tb2 above. As an example, the third time block tb2 is a shorter time interval than the second time block tb2, and may have a time interval that corresponds to the previous 3 minutes based on the first switching timing t1 and the next 3 minutes based on the second switching timing t2 which are identified during the second time block tb2. However, since the disclosure is not limited thereto, the third time block tb3 may have various time intervals according to a design method.

The processor 6 may identify whether the RGB characteristics of the content are changed and whether the video characteristics are changed during the reset third time block tb3, thereby identifying the first switching timing t1 and the second switching timing t2. The processor 6 may determine whether the first switching timing t1 and the second switching timing t2 identified during the third time block tb3 and the first switching timing t1 and the second switching timing t2 identified during the second time block tb2 are identified.

If they are not identical to each other, the processor 6 may reflect the newly identified first switching timing t1 and second switching timing t2 in the switching timing table 91 during the third time block tb3.

In this way, the processor 6 may learn the switching timing by a process of comparing the switching timing identified based on a new time block tb3 with the switching timing identified based on the previous time block tb2. Accordingly, the processor 6 may perform more efficient and environmentally adaptive identification of the content switching timing.

Figure 11:
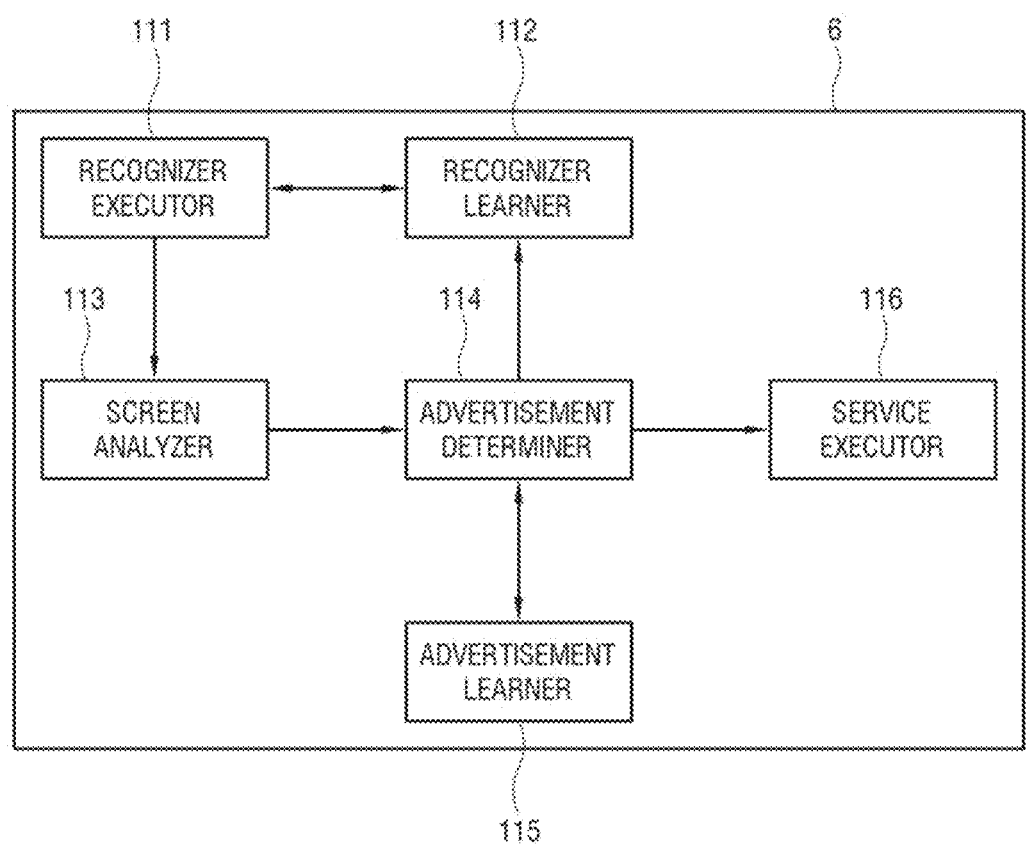
FIG. 11 is a diagram showing a configuration of the processor illustrated in FIG. 2 according to an embodiment.

FIG. 11 is a diagram showing an example of a configuration of the processor shown in FIG. 2 according to an embodiment. Hereinafter, each component of the processor 6 will be described in detail with reference to FIG. 11.

The processor 6 may include a recognizer executor 111. The recognizer executor 111 may determine whether to identify the switching timing of the content. For example, as described with reference to FIGS. 9 and 10, the recognizer executor 111 may set the first time block tb1 with reference to the EPG 90, and may identify whether the RGB characteristics of the image of the content displayed on the display 14 are changed when the timing of the set first time block tb1 arrives. In addition, as the switching timing between contents is identified, when the switching timing is reset to be the second time block tb2 having a different time interval from the first time block tb1 by a recognizer learner 112, the third time block tb3, and the like, the recognizer executor 111 may identify whether the RGB characteristics of the image of the contents displayed on the display 14 are changed when the timing such as the third time block tb3 arrives.

The recognizer executor 111 may include an RGB characteristic identification module or the like for identifying whether the RGB characteristics are changed. As an example, when the timing of the reset second time block tb2, third time block tb3, etc., arrives, the RGB characteristic identification module or the like for the image of the content displayed on the display 14 is driven, and thus, it is possible to identify whether the RGB characteristics are changed.

In this way, the recognizer executor 111 may identify whether or not the RGB characteristics are changed based on the time block tb, so resources may be efficiently utilized.

The processor 6 may include the recognizer executor 112. When the switching timing between contents is recognized, the recognizer learner 112 may learn the recognized switching timing and reset the time block tb based on the learned switching timing. More specifically, when there is a change in RGB characteristics during the first time block tb1 set by the recognizer executor 111, a screen analyzer 113 may identify whether the video characteristics are changed for the content with the change in the RGB characteristics, and an advertisement determiner 114 may identify the switching timing between contents according to the type switching between contents based on whether or not the identified video characteristics are changed. For example, the recognizer learner 112 may learn the switching timing identified by the advertisement determiner 114, learn the second time block tb2 having a smaller time interval than the first time block tb1 based on the learned switching timing, and learn the third time block tb3 having a smaller time interval than the second time block tb2. In this case, the recognizer learner 112 may provide the information on the learned second time block tb2, the third time block tb3, and the like, and thus, the recognizer executor 111 may identify whether or not the RGB characteristics are changed according to the learned second time block tb2, third time block tb3, or the like.

In this way, since the recognizer learner 112 may learn the switching timing between contents, it is possible to create the environment in which the switching timing between contents may be adaptively identified.

The processor 6 may include the screen analyzer 113. As described above, the screen analyzer 113 may identify the video characteristics of the content identified as having the change in the RGB characteristics during the time block tb set by the recognizer executor 111. As an example, the screen analyzer 113 may identify video characteristics such as a person and a character included in the image frame through various optical recognition methods for the image frame of the content.

Not only the video characteristics but also the sound characteristics of the content may be identified for the content identified as having the change in the RGB characteristics. In this case, according to the design method, the screen analyzer 113 may identify the sound characteristics together, or a separate sound analyzer may identify the sound characteristics. However, in the following, for convenience of explanation, it is assumed that the video characteristics are identified for the content identified as having the change in the RGB characteristics.

In this way, since the screen analyzer 113 may identify the video characteristics of the content identified as having the change in the RGB characteristics, an advertisement determiner 114 may more accurately determine the type of content, that is, whether the content is a non-advertisement or an advertisement.

The processor 6 may include an advertisement determiner 114. The advertisement determiner 114 may identify the type of content based on the video characteristic identified by the screen analyzer 113, and may identify the switching timing according to the switching between different types of content based on the change in the video characteristics. More specifically, the advertisement determiner 114 may identify whether the content is a non-advertisement such as a drama or news or an advertisement based on the video characteristics. If necessary, the advertisement determiner 114 may identify the type of content by referring to the video characteristic table 5 in which the video characteristics corresponding to the type of content is classified by factor.

In this way, the advertisement determiner 114 may identify the switching timing between contents based on whether or not the video characteristics between contents are changed, and thus may more accurately identify the switching timing.

The processor 6 may include the advertisement learner 115. The advertisement learner 115 may learn the video characteristics for each content type. For example, when the advertisement determiner 114 identifies that the type of content is an advertisement based on the video characteristics, the advertisement learner 115 may learn, for example, the video characteristics that are not included as the video characteristics corresponding to the advertisement in the video characteristic table 5 among the video characteristics of the advertisement. For example, the advertisement learner 115 may reflect the video characteristics learned in response to the advertisement in the video characteristic table 5, and thus when the advertisement determiner 114 identifies whether the video characteristics of the content are changed by referring to the video characteristic table 5, the advertisement determiner 114 may identify whether the video characteristics of the content may be identified based on the learned video characteristics.

However, since the advertisement determiner 114 is not limited to the advertisement and learns the video characteristics, the advertisement determiner 114 may learn the video characteristics even for contents identified as the non-advertisement such as a drama and news, and reflect the learned results in the video characteristic table 5 so that the advertisement determiner 114 uses the learned result.

In this way, since the advertisement learner 115 may learn the video characteristics corresponding to the type of content, it is possible to create the environment in which various types of content may be adaptively identified.

The processor 6 may include a service executor 116. The service executor 116 may provide various services based on the switching timing between contents identified by the advertisement determiner 114. For example, it is possible to identify whether the user prefers the advertisement based on the start/end time of the before-and-after advertisements or the intermediate advertisements, and it is possible to provide, for example, the advertisement matching the user's preference based on the identified preference. However, since the disclosure is not limited thereto, the service executor 116 may share the information on switching timing between contents with other electronic apparatuses or sell the information to the content provider to generate the revenue.

In this way, the service executor 116 may provide the optimized content service to a user.

Figure 12:
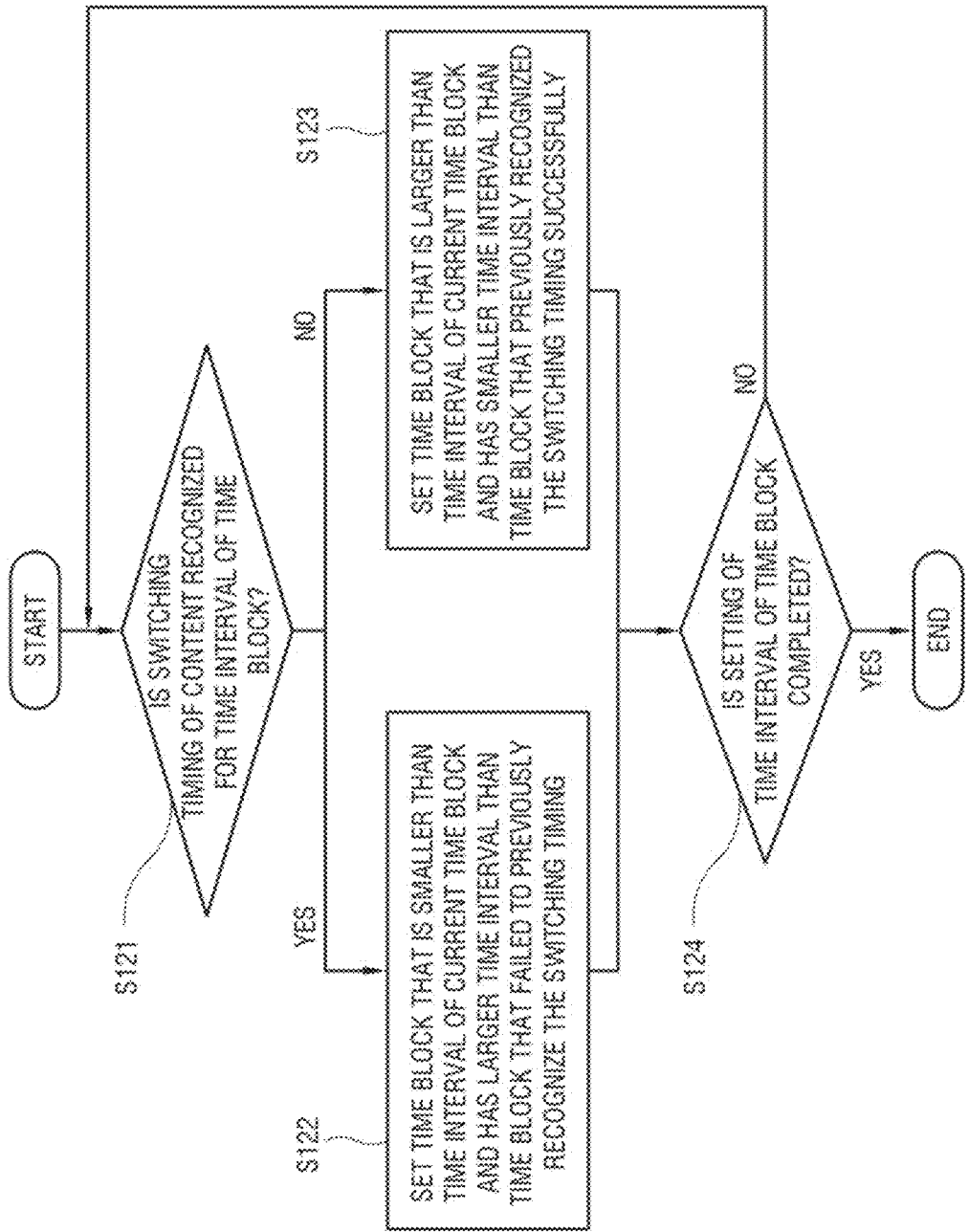
FIG. 12 is a flowchart of a control method of an electronic apparatus for learning a time interval of a time block according to an embodiment.

FIG. 12 is a flowchart of a control method of an electronic apparatus for learning a time interval of a time block according to an embodiment. Hereinafter, the operation of the processor 6 will be briefly described.

As shown in FIG. 12, the processor 6 may identify whether the switching timing between contents is recognized during the time interval of the time block (S121). The recognition of the switching timing between contents may be performed by the method described above with reference to FIG. 10 and the like. The time block may be one that is initially set or one in which a time interval is adjusted in a preset time block. For example, as described with reference to FIG. 10, the time block is the first time block tb1 set to have the time interval including the expected switching timing te1, or the second time block tb2 or the third time block tb3 adjusted from the first time block tb1.

In step S121, when the switching timing between contents is recognized during the time interval of the current time block (YES in step S121), the processor 6 may set a new time block to have a time interval smaller than the time interval of the current time block and larger than a time block previously that previously failed to recognize the content switching timing (S122). For example, the processor 6 may further reduce 20 minutes, 10 minutes, 5 minutes, etc., than the time interval of the current time block. Here, since 20 minutes, 10 minutes, 5 minutes, etc., are for convenience of description, the time interval may be variously determined according to a design method. In addition, the processor 6 may reduce any one or both of the start or end points of the current time block. However, even if the time interval of the current time block is reduced, the processor 6 is set to be at least larger than the time interval of the time block that previously failed to recognize the content switching timing. The processor 6 sets the time interval of the time block so that the start time of the adjusted time block is later than the start time of the previous content, and the end time of the time block becomes before the end time of the next content.

In step S121, when the switching timing between contents is not recognized during the time interval of the current time block (NO in step S121), the processor 6 may set a new time block to have a time interval larger than the time interval of the current time block and smaller than a time block that previously recognizes the content switching timing successfully (S123). For example, the processor 6 may further increase 20 minutes, 10 minutes, 5 minutes, etc., than the time interval of the current time block. Here, since 20 minutes, 10 minutes, 5 minutes, etc., are for convenience of description, the time interval may be variously determined according to a design method. In addition, the processor 6 may increase any one or both of the start or end points of the current time block. However, even if the time interval of the current time block is increased, the processor 6 is set to be at most smaller than the time interval of the time block that previously recognizes the content switching timing successfully.

Next, the processor 6 identifies whether the time interval setting of the time block is completed (S124). That is, the processor 6 checks whether the time interval of the current time block is no longer adjusted. For example, the time interval of the current time block may be reduced to the minimum interval centering on the recognized content switching timing. The size of the minimum interval may be determined in advance in consideration of the fact that the time point or end point of the content to be switched may vary according to a broadcasting state or the like. When the processor 6 identifies that the content switching timing is recognized in the current time block and that the time interval reaches the minimum period, the processor 6 may end the procedure when identifying that the time interval setting of the time block is completed (YES in step S124).

In step S124, when the processor 6 identifies that the time interval setting is not completed, the processor 6 returns to step S121 again, and repeatedly performs each step until the time interval setting of the time block is completed.

In this way, since the processor 6 may adjust the time interval of the time block according to whether the content switching timing is recognized, it is possible to improve the identification accuracy and efficiency for the switching timing.

Figure 13:
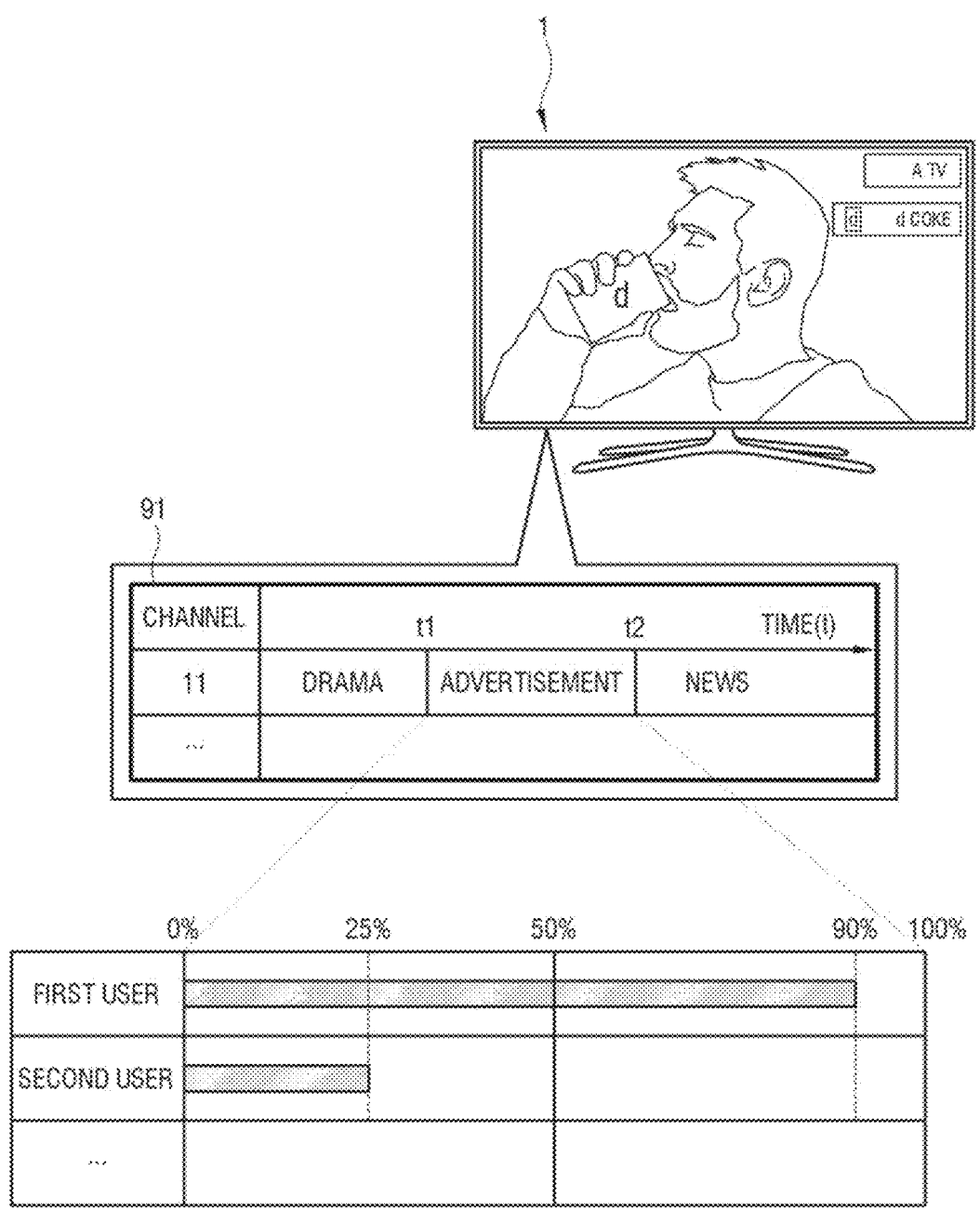
FIG. 13 is a diagram showing an operation related to second content in relation to step S34 of FIG. 3 according to an embodiment.

FIG. 13 is a diagram showing an operation related to second content in relation to step S34 of FIG. 3 according to an embodiment. As described above, the processor 6 may identify the first switching timing t1 from a drama to an advertisement and the second switching timing t2 from an advertisement to news. For example, the processor 6 may identify an advertisement time t1-t2 when the advertisement is displayed on the display 14 by referring to the switching timing table 91.

The processor 6 may identify whether a user prefers an advertisement based on the advertisement time t1-t2. When an advertisement is displayed on the display 14, the processor 6 may photograph or capture an area in front of the electronic apparatus 1 through an image acquirer such as a camera, and identify the user and when the user is viewing the display 14 based on the information acquired from the photographed or captured image. The processor 6 may use various recognition algorithms for the user recognition. However, since the disclosure is not limited to recognizing the user based on the image, the processor 6 may identify the user based on the user's uttered voice received through the microphone 17.

The processor 6 may identify whether the user prefers the advertisement based on the user input of the user identified for the displayed advertisement. For example, when a first user views 90% of the total advertisement time t1-t2 for the displayed advertisement and then makes a change to another channel, the processor 6 may identify that the first user prefers the advertisement based on the history of viewing 90% of the total advertisement time t1-t2. On the other hand, when the second user views only 25% of the total advertisement time t1-t2 for the same advertisement and then makes a change to another channel, the processor 6 may identify that the second user does not prefer the advertisement. However, since each user's preference is not identified only as preference or non-preference, it may be identified as several preference stages in proportion to an advertisement viewing time according to a design method.

In this way, the processor 6 may identify whether the user prefers the advertisement based on the switching timings t1 and t2 of the advertisement, and improve the identification accuracy of the preference.

Figure 14:
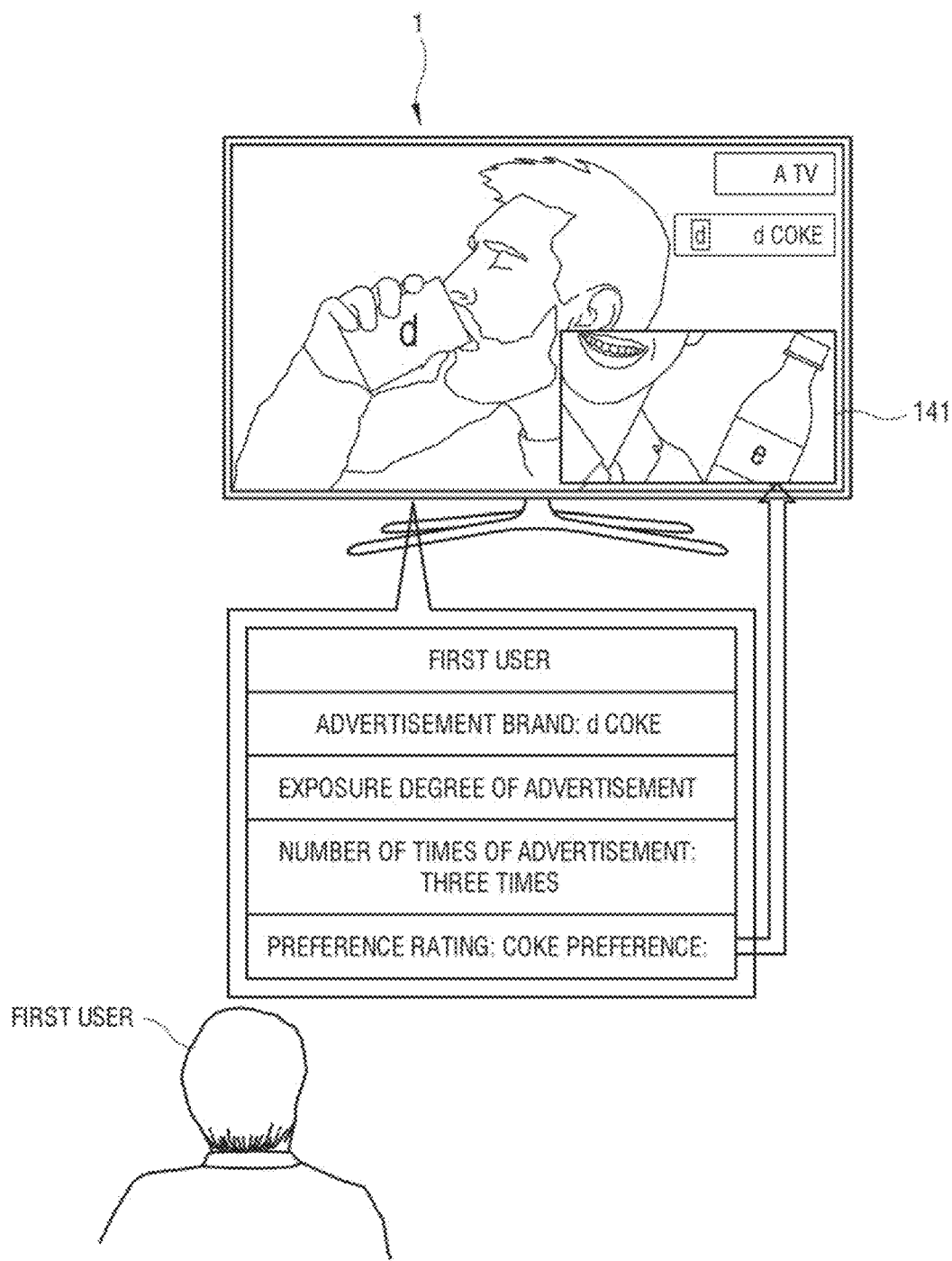
FIG. 14 is a diagram showing a process of another operation related to the second content in relation to step S34 of FIG. 3 according to an embodiment.

FIG. 14 is a diagram showing another operation related to the second content in relation to step S34 of FIG. 3 according to an embodiment. As described in FIG. 13, when the processor 6 identifies that the first user prefers the advertisement displayed on the display 14, the processor 6 may display the related advertisement 141 matching the user's preference on the display 14.

More specifically, as described with reference to FIG. 6, the processor 6 may identify the video characteristics of the advertisement by performing the optical character recognition, the optical object recognition, and the like for the advertisement displayed on the display 14. For example, the video characteristics of the identified advertisement may identify that the content logo is a picture with alphabet "d", and the content title is "d coke" in relation to the title factor. The processor 6 may identify a related advertisement 141 having the video characteristics corresponding to the identified content logo, content title, and the like. For example, the processor 6 may identify the related advertisement 141 whose the content title is "e coke" in relation to the title factor. The processor 6 may display the identified related advertisement 141, for example, in a picture in picture (PIP) method for the advertisement time t1-t2.

In identifying the related advertisement 141, the processor 6 may additionally take into account not only the video characteristics, but also the user's history of the displayed advertisement. As an example, as described with reference to FIG. 13, it is possible to identify whether the first user prefers the advertisement and identify the related advertisement 141 according to the identified preference by comprehensively considering the advertisement viewing time of the first user, the number of times the first user is exposed to the advertisement, the history of purchasing the advertised product by the first user using the electronic apparatus 1, and the like.

In this way, since the processor 6 may provide the content service according to the video characteristics of the displayed advertisement, the processor 6 may provide the optimized content service to the user.

Various embodiments disclosed in the disclosure may be implemented as software including one or more instructions stored in a machine-readable medium such as the electronic apparatus 1. For example, the processor 6 of the electronic apparatus 1 may call and execute at least one of one or more stored instructions from the storage medium. This makes it possible for a device such as the electronic apparatus 1 to be operated to perform at least one function according to the at least one instructions called. The one or more instructions may include codes generated by a compiler or codes executable by an interpreter. The machine-readable storage medium may be provided in the form of a non-transitory storage medium. Here, the 'non-transitory storage medium' is a tangible device, and does not include a signal (for example, electromagnetic waves), and the term does not distinguish between the case where data is stored semi-permanently on a storage medium and the case where data is temporarily stored thereon. For example, the 'non-transitory storage medium' may include a buffer in which data is temporarily stored.

For example, the methods according to various embodiments disclosed in this document may be provided by being included in a computer program product. The computer program product according to the disclosure may include instructions of software executed by a processor, as described above. The computer program product may be traded as a product between a seller and a purchaser. The computer program product may be distributed in the form of the machine-readable storage medium (for example, CD-ROM), or may be distributed (for example, download or upload) through an application store (for example, Play Store™) or may be directly distributed (for example, download or upload) between two user devices (for example, smartphones) online. In case of the online distribution, at least a portion of the computer program product (for example, downloadable app) may be at least temporarily stored in the machine-readable storage medium such as a memory of a server of a manufacturer, a server of an application store, or a relay server or be temporarily generated.

According to the disclosure, the electronic apparatus capable of accurately identifying the switching timing between contents to provide the optimized content service according to the user's preference for the content identified based on the switching timing, and the control method thereof are provided.

Hereinabove, the disclosure has been described in detail through the example embodiments, but the disclosure is not limited thereto and may be implemented in various ways within the scope of the claims.

What is claimed is:

1. An electronic apparatus, comprising:
an interface circuitry;
a display;
a memory storing one or more instructions; and
a processor configured to execute the one or more instructions to:
receive a broadcast signal of any one of a plurality of channels through the interface circuitry;
control the display to display an image of a plurality of contents comprising a first content and a second content based on the received broadcast signal;
identify a third content between the first content and the second content based on a change in a video characteristic defined corresponding to each type of the plurality of contents, a type of the third content being different from types of the first content and the second content; and
perform an operation related to the identified third content,
wherein the processor is further configured to:
obtain information about an end point of a first broadcast time of the first content and a start point of a second broadcast time of the second content,
based on the obtained information, identify whether a start point and an end point of the third content is identified within a time interval which includes the end point of the first broadcast time of the first content and the start point of the second broadcast time of the second content,
based on identifying whether the start point and the end point of the third content is identified within the time interval, adjust the time interval to be smaller or larger, and
identify whether the start point and the end point of the third content is identified within the adjusted time interval.

2. The electronic apparatus of claim 1, wherein the processor is further configured to identify the change in the video characteristic based on a change in an RGB characteristic of the displayed image defined corresponding to the types of the plurality of contents.

3. The electronic apparatus of claim 1, wherein the processor is further configured to identify the video characteristic based on recognition of an object in the displayed image.

4. The electronic apparatus of claim 3, wherein the object in the displayed image comprises one or more of a person, a logo, a brand, or a title.

5. The electronic apparatus of claim 1, wherein the processor is further configured to:
control a speaker to output a sound of the plurality of contents, and
identify a switching timing based on a change in a sound characteristic defined corresponding to the types of the plurality of contents.

6. The electronic apparatus of claim 5, wherein the processor is further configured to identify the sound characteristic based on a feedback sound detected by a microphone that receives the output sound.

7. The electronic apparatus of claim 6, wherein the identified sound characteristic comprises one or more of the type or volume of the sound.

8. The electronic apparatus of claim 1, wherein the processor is further configured to perform a second operation based on information that is obtained through learning about the change in the video characteristic from the first content to the second content and is grouped for each type of the plurality of contents.

9. The electronic apparatus of claim 1, wherein the processor is further configured to:
store information on a switching timing in the memory, and
update the stored information to information on a timing different from the switching timing based on an identification that the first content switches to the second content at the timing different from the switching timing.

10. The electronic apparatus of claim 1, wherein the processor is further configured to identify the change in the video characteristic corresponding to each type of the plurality of contents based on information on a switching timing during a time interval including the switching timing.

11. The electronic apparatus of claim 10, wherein the processor is further configured to adjust the time interval to include a timing different from the switching timing when it is identified that the first content to the second content at the timing different from the switching timing.

12. The electronic apparatus of claim 1, wherein the processor is further configured to identify whether a user prefers the second content based on a user's viewing time for the second content.

13. The electronic apparatus of claim 12, wherein the processor is further configured to acquire information grouped for each type of the plurality of contents according to whether the user prefers the second content identified based on the viewing time.

14. A control method of an electronic apparatus, comprising:
- receiving a broadcast signal of any one of a plurality of channels;
- displaying an image of a plurality of contents comprising a first content and a second content based on the received broadcast signal;
- identifying a third content between the first content and the second content based on a change in a video characteristic defined corresponding to each type of the plurality of contents, a type of the third content being different from the types of the first content and the second content;
- performing an operation related to the identified third content;
- obtaining information about an end point of a first broadcast time of the first content and a start point of a second broadcast time of the second content;
- based on the obtained information, identifying whether a start point and an end point of the third content is identified within a time interval which includes the end point of the first broadcast time of the first content and the start point of the second broadcast time of the second content,
- based on identifying whether the start point and the end point of the third content is identified within the time interval, adjusting the time interval to be smaller or larger, and
- identifying whether the start point and the end point of the third content is identified within the adjusted time interval.

15. A non-transitory recording medium storing program code comprising instructions for causing an electronic device to:
- receive a broadcast signal of any one of a plurality of channels;
- display an image of a plurality of contents comprising a first content and a second content based on the received broadcast signal;
- identify a third content between the first content and the second content based on a change in a video characteristic defined corresponding to each type of the plurality of contents, a type of the third content being different from the types of the first content and the second content;
- perform an operation related to the identified third content;
- obtain information about an end point of a first broadcast time of the first content and a start point of a second broadcast time of the second content;
- based on the obtained information, identify whether a start point and an end point of the third content is identified within a time interval which includes the end point of the first broadcast time of the first content and the start point of the second broadcast time of the second content,
- based on identifying whether the start point and the end point of the third content is identified within the time interval, adjust the time interval to be smaller or larger, and
- identify whether the start point and the end point of the third content is identified within the adjusted time interval.

* * * * *